(12) United States Patent
Ito

(10) Patent No.: US 6,252,721 B1
(45) Date of Patent: Jun. 26, 2001

(54) MOLD FOR MOLDING OPTICAL ELEMENT, MOLD STRUCTURE FOR MOLDING OPTICAL ELEMENT, MOLDING APPARATUS, OPTICAL ELEMENT MOLDED FROM RESIN MATERIAL, AND OPTICAL ELEMENT CONSTITUTED BY PLURALITY OF OPTICAL SURFACES

(75) Inventor: Kazuhiko Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/395,361

(22) Filed: Sep. 14, 1999

(30) Foreign Application Priority Data

Sep. 16, 1998 (JP) ................................. 10-261857
Sep. 1, 1999 (JP) ................................. 11-247786

(51) Int. Cl.[7] .............................. G02B 3/00; G02B 7/02; B29D 11/00
(52) U.S. Cl. ..................... 359/642; 359/811; 359/819; 359/821; 264/1.1
(58) Field of Search .................................... 359/642, 811, 359/812, 819, 821; 264/1.1; 249/105, 117

(56) References Cited

U.S. PATENT DOCUMENTS 4,775,217 10/1988 Ellis .
5,329,406 * 7/1994 Nakanishi ........................... 359/811

FOREIGN PATENT DOCUMENTS 2-297516 12/1990 (JP) .
4-65210 3/1992 (JP) .
5-96580 4/1993 (JP) .

* cited by examiner

Primary Examiner—Georgia Epps
Assistant Examiner—Michael A. Lucas
(74) Attorney, Agent, or Firm—Fitzpatrick, Cella, Harper & Scinto

(57) ABSTRACT

This invention is to provide a mold for molding an optical element in which eccentricity of an optical insert can be suppressed as much as possible. In order to achieve this object, in a mold for molding an optical element, which molds an optical element having a curved optical surface on at least one surface thereof by injecting and solidifying a molten resin material, a mold member that forms a cavity surface for molding the optical surface includes a plurality of specular optical inserts that divide the optical surface into a plurality of surfaces. Contact surfaces of the divided specular optical inserts which come into contact with each other have grooves extending from the optical surface.

18 Claims, 22 Drawing Sheets

F I G. 19
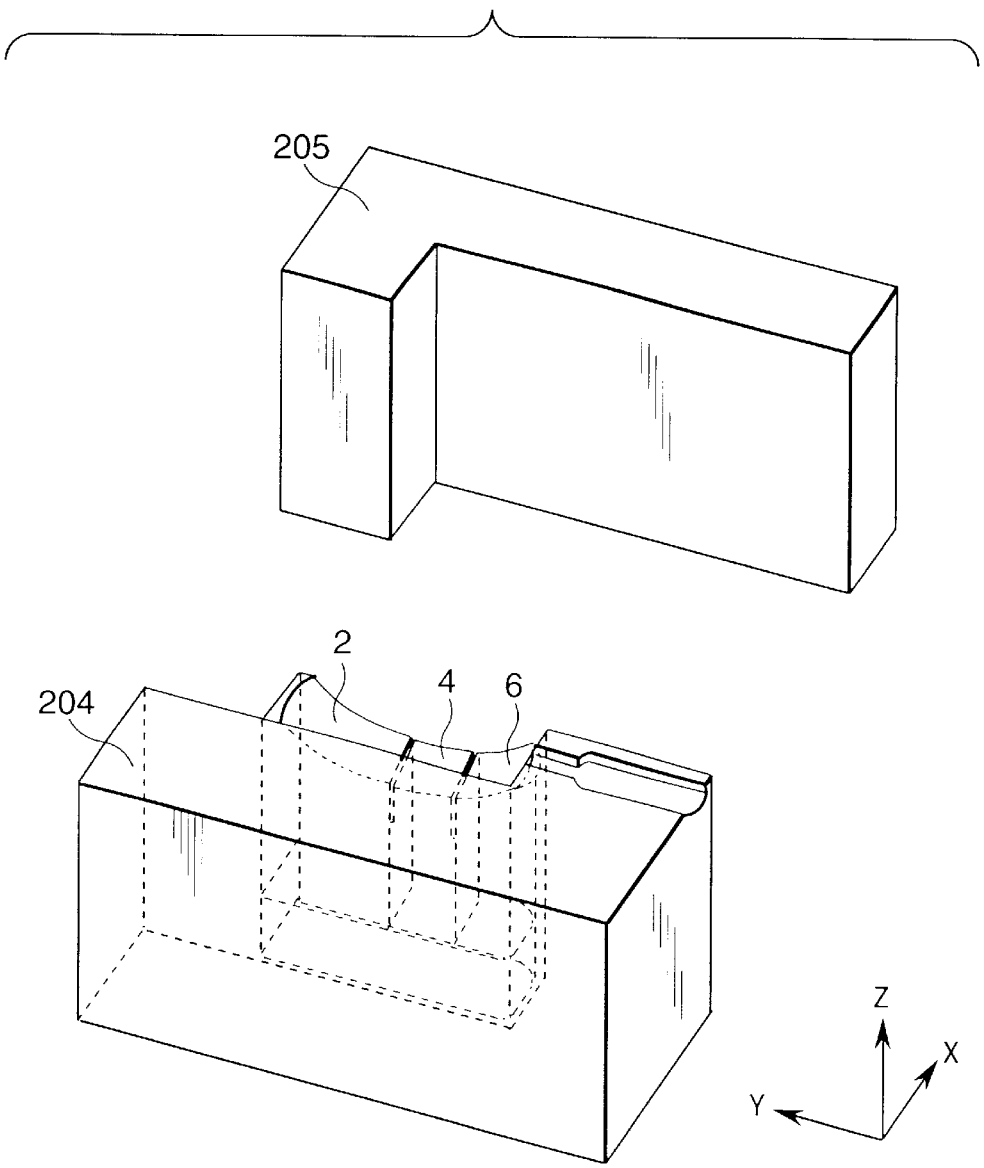

F I G. 21
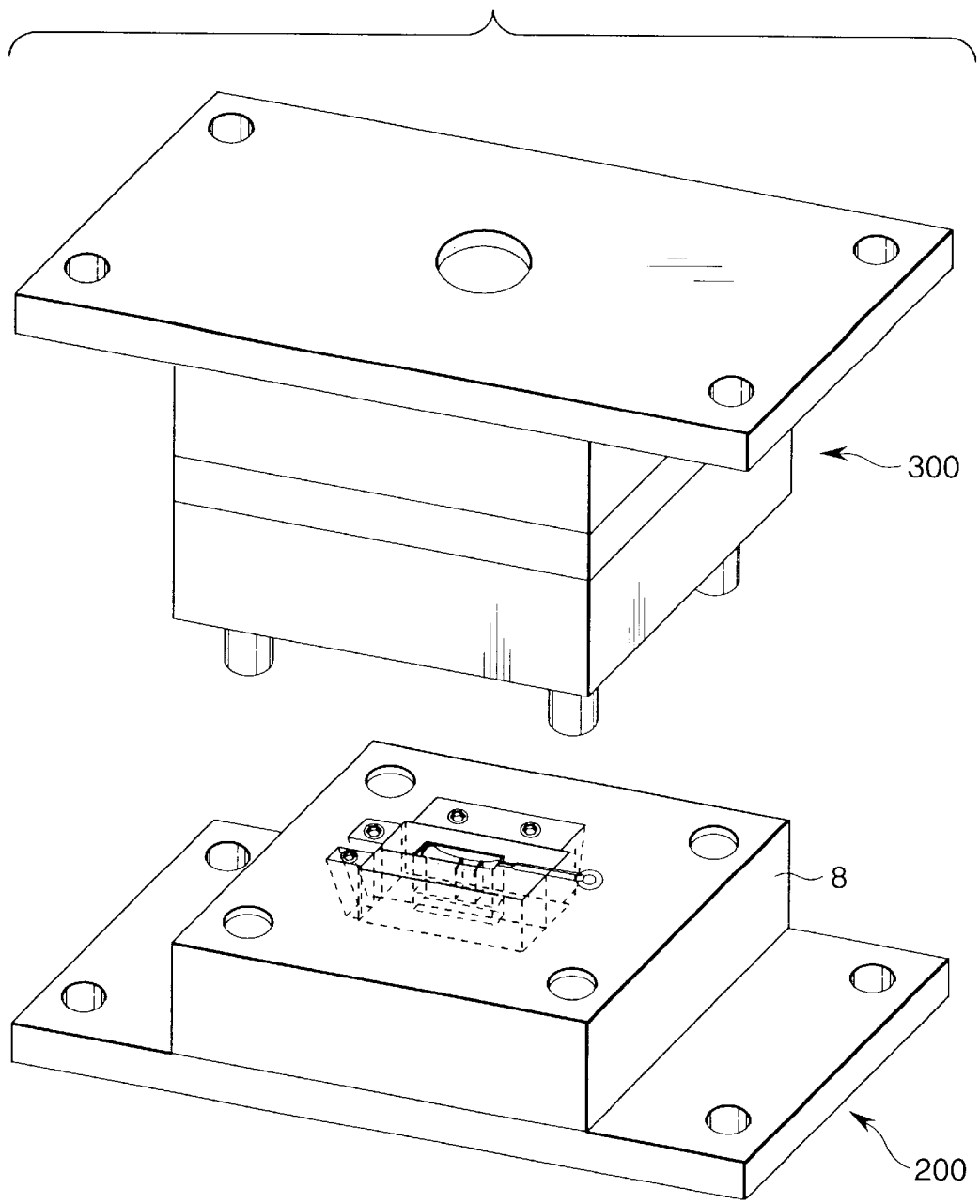

MOLD FOR MOLDING OPTICAL ELEMENT, MOLD STRUCTURE FOR MOLDING OPTICAL ELEMENT, MOLDING APPARATUS, OPTICAL ELEMENT MOLDED FROM RESIN MATERIAL, AND OPTICAL ELEMENT CONSTITUTED BY PLURALITY OF OPTICAL SURFACES

BACKGROUND OF THE INVENTION

The present invention relates to an optical element having a spherical, aspherical, or free surface, and a mold and mold structure for molding the optical element.

In particular, the present invention relates to a mold and mold structure used when manufacturing an optical element, in which optical functional surfaces as free surfaces are continuously arranged, by molding a resin material.

The present invention also relates to an optical element in which a mold member for forming a cavity surface that molds a curved spherical, aspherical, or free surface is constituted by a plurality of optical inserts.

In particular, the present invention relates to an optical element in which a plurality of curved optical functional surfaces are continuously arranged.

In the technique of molding a camera lens and a prism having a curved optical functional surface, e.g., an aspherical, spherical, or free surface, a toric lens formed of a generatrix curved surface and a directrix curved surface that have different radii of curvature, or the like by injecting a resin material into a mold and cooling and solidifying the resin material, to mold an optical surface shape precisely as designed requires a very high-level machining/assembling technique in formation of the cavity surface of a mold that forms the optical surface.

In particular, when an optical element having light incident and exit surfaces each of which is not composed of a single optical surface but of a combination of a plurality of curved optical surfaces is to be molded by injecting a resin material into a mold and cooling and solidifying the resin material, to mold the optical element such that its plurality of free surfaces satisfy a relative positional relationship precisely as designed requires a very high technical level.

For example, the optical element shown in FIG. 1 is a lens used in, e.g., a video camera, a still video camera, a finder optical system, an image input apparatus, an image forming apparatus, or the like. In this optical element, a plurality of optical surfaces form one lens surface, and optical functional surfaces are adjacent to each other. The respective optical surfaces are designed to maintain a certain positional relationship with each other.

If the lens optical surface has a complicated shape, a technique that molds this lens by placing a nest in a mold is known (Japanese Patent Laid-Open No. 5-96580).

Japanese Patent Laid-Open No. 4-65210 proposes a following mold. A recess is formed in either one of stationary and movable cavity blocks, and a projection is formed in the remaining one of the stationary and movable cavity blocks. The stationary and movable molds are then aligned. This aims at eliminating misalignment between the optical axis of the aspherical surface of a lens incident surface and the optical axis of the spherical surface of a lens exit surface, as in an aspherical lens.

When the transfer surface that constitutes a cavity for molding a free surface shape is composed of a free surface, and particularly when a plurality of free surfaces must be arranged side by side continuously, this transfer surface (cavity surface) is divided into a plurality of specular optical inserts.

To suppress eccentricity or misalignment of the specular optical inserts within an allowable range, the clearance between the specular optical inserts and the cavity block pocket which is to accommodate the specular optical inserts must be minimized. Partly due to the limit of the machining precision of the components, if the error in size of the specular optical insert or of the specular optical insert pocket of the cavity block is large, the gap between the specular optical inserts and the cavity block causes backlash to produce eccentricity and misalignment, largely affecting the dimensional precision of the respective aspherical surfaces.

Depending on the size error, the specular optical inserts may be press-fitted into the specular cavity block pocket. This causes distortion in the cavity-forming surfaces of the specular optical insert to adversely affect the optical performance of the optical element to be molded.

FIG. 1 shows an optical element 1 having an optical surface formed by arranging a plurality of optical functional surfaces 1A, 1B, 1C, . . . as free surfaces side by side. If this optical element 1 is to be injection-molded by using a resin material, the cavity surfaces of a mold member, in which the resin material is to be injected, cooled, and solidified to mold the optical element 1, must have a predetermined optical positional relationship with each other. Also, in order to form the cavity surfaces, the positional relationship among the respective mold portions must be adjusted.

An optical prism having curved reflecting surfaces is disclosed in, e.g., U.S. Pat. No. 4,775,217 and Japanese Patent Laid-Open No. 2-297516.

In the optical prism having the curved reflecting surfaces, since degradation in optical performance due to eccentricity of the reflecting surfaces is generally larger than in an optical prism constituted of only flat surfaces, the positional precision of each reflecting surface is very strict.

The technique shown in U.S. Pat. No. 4,775,217 and Japanese Patent Laid-Open No. 2-297516 does not refer to a reflecting surface adjusting method, assembling method, and manufacturing method that guarantee the positional precision of each reflecting surface.

When the number of reflecting surfaces of the optical prism is increased, eccentricities of the respective reflecting surfaces are accumulated. The larger the number of reflecting surfaces, the smaller and stricter the amount of eccentricity allowable for each reflecting surface. Hence, a technique that guarantees the positional precision of each reflecting surface is sought for.

Conventionally, as a method of incorporating a nested piece for suppressing eccentricity, the following two methods are known. According to the first method, the difference between the inner diameter of a bag-like piece holder and the outer size of a nested piece is minimized to suppress the fitting gap. According to the second method, as described in Japanese Patent Laid-Open No. 5-9680, the outer walls of optical inserts are urged against the inner walls of mold base by optical insert press plates with screw shafts. The optical inserts are to be incorporated inside the mold bases. The optical insert press plates oppose the outer walls of the optical inserts and are formed at the distal ends of screw shafts. The screw shafts generate axial forces perpendicular to the inner wall surfaces of the templates perpendicular to each other.

These conventional methods have the following drawbacks. Even if the clearance between the optical insert and the cavity block for incorporating it is minimized to suppress the eccentricity or misalignment of the optical insert within an allowable range, when incorporating the optical insert, since this clearance is always required to incorporate the optical insert in the cavity block, the eccentricity corresponding to the amount of this clearance cannot be removed. When the outer size of the optical insert or the inner diameter of the cavity block should have an error, if small, then backlash is produced to cause eccentricity or misalignment, or the nested piece may be press-fitted in the piece holder to generate distortion on the cavity-constituting surface of the optical insert. This results in parallel eccentricity and tilt eccentricity.

As the requirements for the parallel eccentricity and tilt eccentricity become strict, a right angle between the inner surface of the cavity block and the bottom surface of the optical insert, a right angle between the side surfaces of the cavity block and optical insert, flatness of the side surfaces of the cavity block and optical insert, and the like must be set strict, and the clearance between the cavity block and the optical insert must be suppressed. The smaller the clearance, the more difficult to incorporate the optical insert. Each time the optical insert is incorporated, its side surface and the inner surface of a cavity block pocket come into contact with each other to increase their surface roughness. Then, the contact state becomes unstable, and the flatness and right angles become inaccurate.

A method of urging an optical insert against the inner surface of a cavity block from two orthogonal side surfaces through a block can be applied to a large-scale structure in which one optical insert is used and, if the optical insert has a size exceeding a certain degree, is adjusted with a screw shaft. This method cannot be applied to a plurality of optical surfaces, which must be arranged side by side in one optical component, due to a structural impossibility. When the plurality of optical inserts are used, depending on the contact state among the contact surfaces of the optical inserts, a tilt or rotational deformation occurs in each nested piece. Therefore, the eccentricity of each optical surface with respect to the optical axis must be controlled.

SUMMARY OF THE INVENTION

The present invention has been made in view of the problems described above, and has as its object to provide a mold for molding an optical element, mold structure for molding an optical element, molding apparatus, optical element molded from a resin material, and optical element constituted by a plurality of optical surfaces, each of which is capable of minimizing eccentricity of an optical insert.

In order to solve the above problems and to achieve the above object, in the present invention, a mold for molding an optical element is characterized as follows according to its first aspect.

Namely, in a mold for molding an optical element, which molds an optical element having a curved optical surface on at least one surface thereof by injecting and solidifying a melting resin material, a mold member that forms a cavity surface for molding the optical surface comprises a plurality of optical inserts that divide the optical surface into a plurality of surfaces, and contact surfaces of the divided optical inserts which come into contact with each other comprise grooves extending from the optical surface.

In the present invention, a mold structure for molding an optical element is characterized as follows.

Namely, a mold structure for an optical element having a curved optical surface on at least one surface thereof, comprises a plurality of optical inserts that divide a cavity surface for molding the optical surface into a plurality of cavity surfaces, a cavity block having a housing for housing the plurality of optical inserts, and press means for pressing the optical inserts toward reference positions in the cavity block.

In the present invention, an optical element is characterized as follows according to its first aspect.

Namely, an optical element formed of a resin material and comprising a curved optical surface is molded by using a mold member having a cavity surface divided into a plurality of cavity surfaces, the cavity surface serving to mold the optical surface.

In the present invention, the optical element is characterized as follows according to its second aspect.

Namely, an optical element molded from a resin material and comprising a curved optical surface is molded by a mold member having a cavity surface divided into a plurality of cavity surfaces, the cavity surface serving to constitute an optical surface portion, and a groove is formed among the divided cavity surfaces.

In the present invention, the optical element is characterized as follows according to its third aspect.

Namely, an optical element molded from a resin material and having a plurality of discontinuous, adjacent curved optical surfaces is characterized in that a cavity surface of a mold for molding the optical element is formed of specular optical inserts for molding the plurality of optical surfaces, and has a cavity block having a housing for housing the specular optical inserts, and adjusting means for pressing and adjusting the specular optical inserts at reference positions in the housing, and cavity surfaces of the specular optical inserts are positionally adjusted by the adjusting means to mold the resin material.

According to the present invention, an apparatus for molding an optical element is characterized as follows.

More specifically, in a mold for molding an optical element having a plurality of curved optical functional surfaces, a specular optical insert that forms a cavity surface for molding the plurality of optical functional surfaces comprises a plurality of specular optical inserts, the plurality of specular optical inserts are housed in a housing of a cavity block mounted in a mold member, and the cavity block is held by sliding operation of a slide that slides upon opening/closing a stationary mold member and a movable mold member.

In the present invention, the optical element is characterized as follows according to its fourth aspect.

More specifically, a specular optical insert that forms a cavity surface for molding a plurality of optical functional surfaces comprises a plurality of specular optical inserts, the plurality of specular optical inserts are housed in a housing of a cavity block mounted in a mold member, the nest is arranged on a movable mold member side, and the cavity block is held by sliding operation of a slide that slides upon opening/closing a stationary mold member and the movable mold member, thereby molding the plurality of optical functional surfaces continuously.

According to the present invention, a molding apparatus is characterized as follows.

Namely, a stationary specular optical insert is held by a stationary cavity block of a stationary mold member that transfers a first optical functional surface, a second optical functional surface comprises a plurality of optical surfaces, and a plurality of movable specular optical inserts are held by a movable cavity block of a movable mold member that transfers the second optical functional surface.

In the present invention, the mold for molding an optical element is characterized as follows according to its second aspect.

Namely, an optical element having a molding surface for forming an optical surface is inserted in a cavity block pocket for holding the optical insert, and thereafter at least one side surface of the optical insert is pressed by a screw extending through a cavity block to abut the optical insert against an inner surface of the cavity block pocket, thereby fixing the optical insert.

In the present invention, the mold for molding an optical element is characterized as follows according to its third aspect.

Namely, when incorporating an optical element, having a molding surface for molding an optical surface, at a predetermined position in the mold, two blocks having two orthogonal surfaces are arranged to oppose each other, and the optical insert is compressed and held by inner side surfaces of the two blocks.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 19 is a view showing a state wherein nested pieces are abutted according to the third embodiment of the present invention;

FIG. 21 is a view showing the entire portion of a mold according to the third embodiment of the present invention.

DETAILED DESCRIPTION OF THE PREFERRED EMBODIMENTS

The preferred embodiments of the present invention will be described in detail with reference to the accompanying drawings.

First Embodiment

Description on Mold

To mold an optical element lens having a plurality of optical functional surfaces by injection-molding a resin material, a plurality of specular optical inserts forming the respective optical functional surfaces must be incorporated in the specular optical insert housing of a nest that houses the specular optical inserts to suppress misalignment among and distortion of the specular optical inserts.

The mold constituent members including the respective specular optical inserts, the nest, and the like are formed by machining a metal material not affected by heat generated by melting of the resin material, a pressure produced by injection, and the like. In this case, burrs formed at the ridges of the mold constituent members by metal machining must also be considered.

In the mold according to this embodiment, the above problems are considered.

Figure 1:
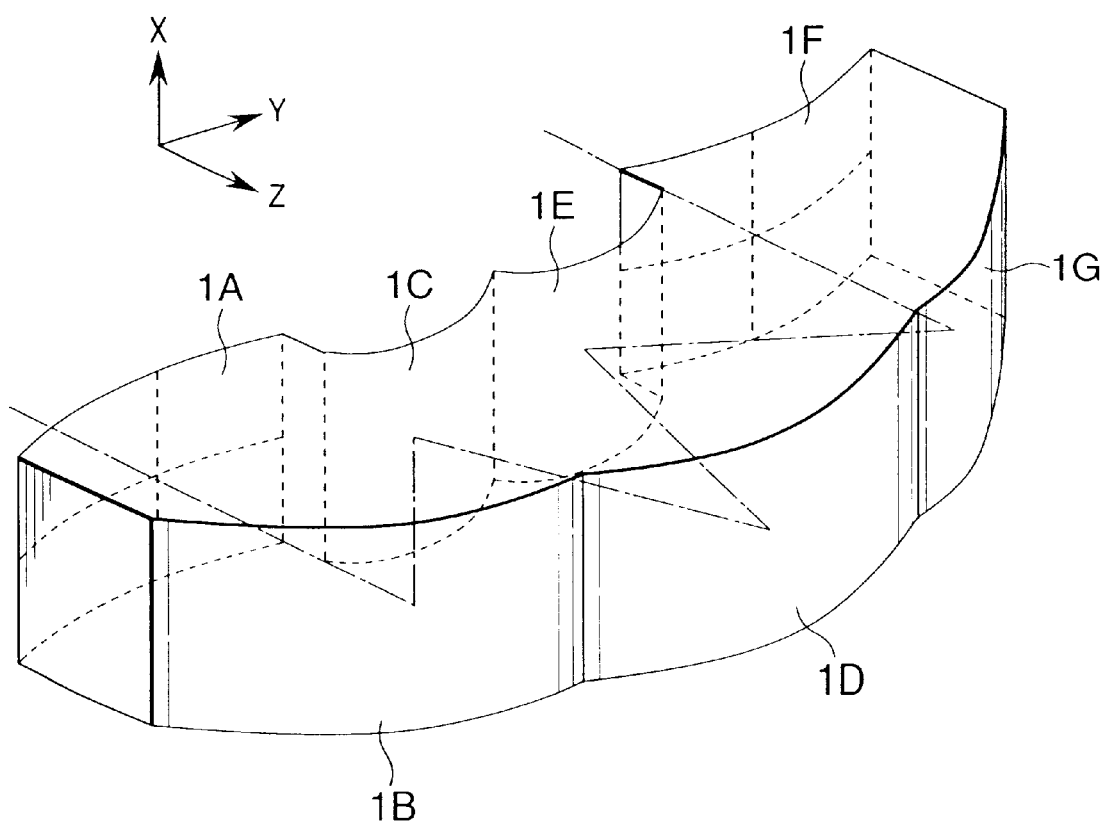
FIG. 1 is a view for explaining a lens to which the present invention is applied.
Figure 2:
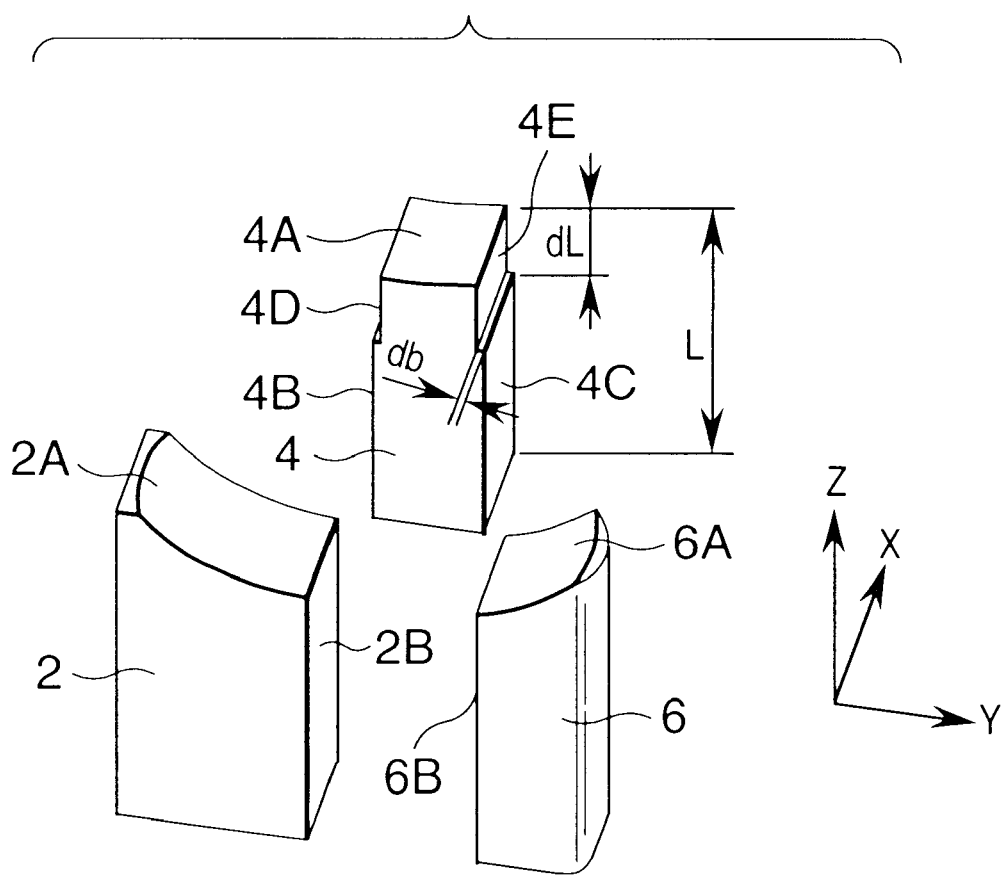
FIG. 2 is a view for explaining specular optical inserts.

FIG. 2 shows the specular cores of a mold according to the first embodiment of the present invention. In FIG. 2, a specular optical insert 4 at the central portion is removed to show its positional relationship in contact with other specular cores 2 and 6.

Figure 3:
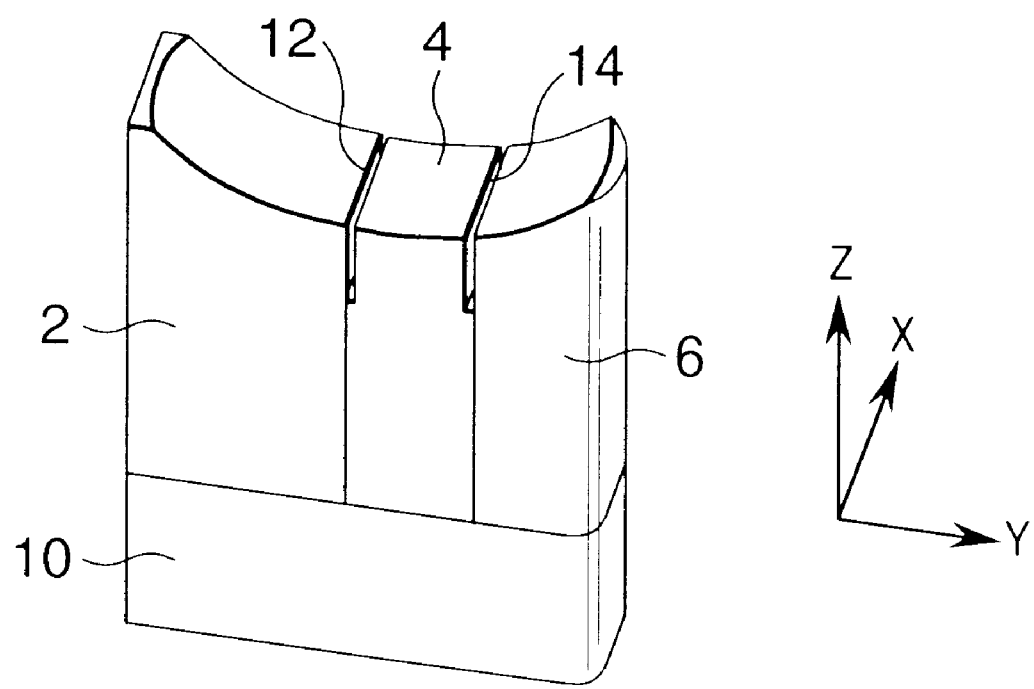
FIG. 3 is a view for explaining specular optical inserts.

FIG. 3 shows the overall outer shape of the specular optical inserts.

Figure 4:
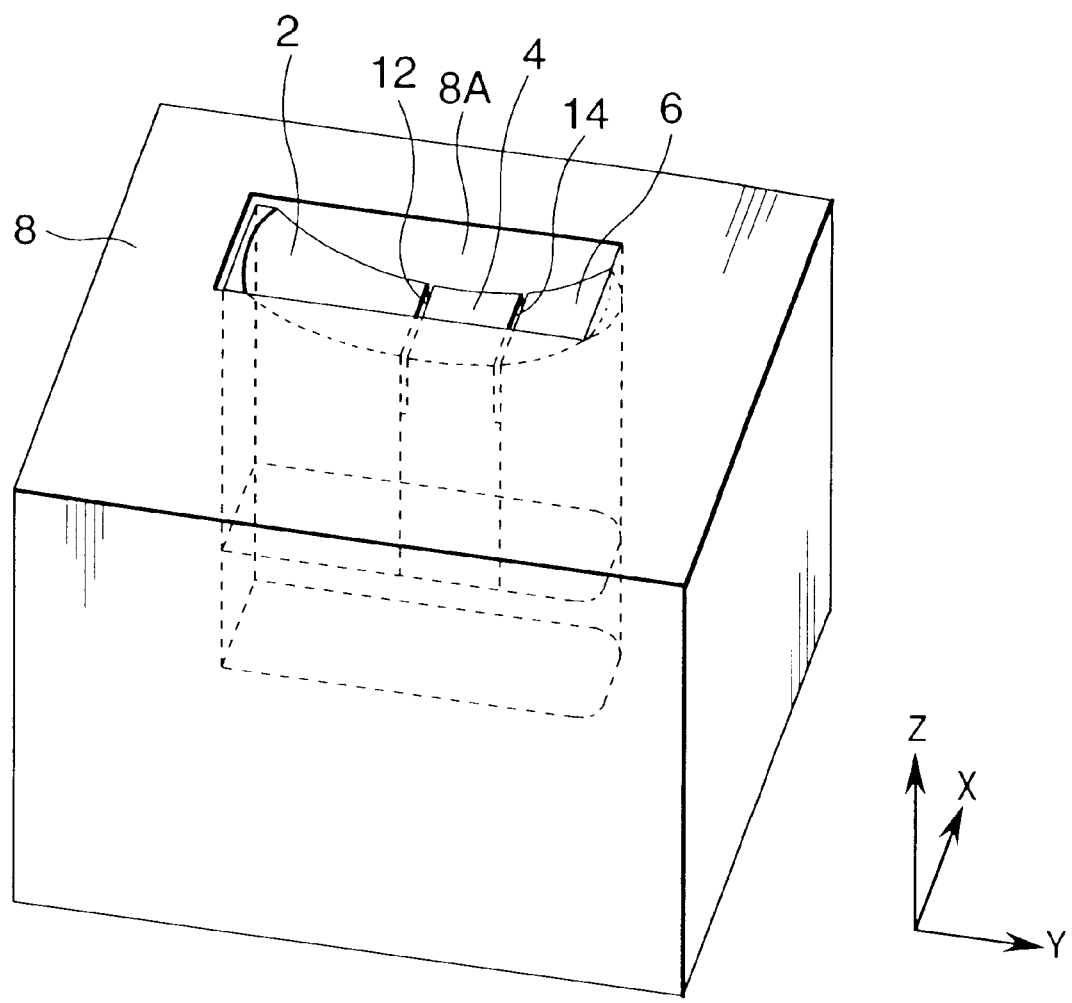
FIG. 4 is a view for explaining a nest that houses the specular optical inserts.

FIG. 4 shows the specular cores mounted in a nest 8.

Referring to FIGS. 2 to 4, reference numerals 2, 4, and 6 denote the first, second, and third specular optical inserts, respectively. The specular optical inserts 2, 4, and 6 respectively have cavity forming surfaces 2A, 4A and 6A for molding the optical functional surfaces.

The nest 8 has a housing 8A for housing the three specular optical inserts 2, 4, and 6. An adjusting spacer 10 for adjusting the heights of the specular optical inserts 2, 4, and 6 is arranged in the housing 8A.

The first, second, and third specular optical inserts 2, 4, and 6 are housed in the nest 8 such that the first and second specular optical inserts 2 and 4 are in contact with each other through contact surfaces 2B and 4B and that the second and third specular optical inserts 4 and 6 are in contact with each other through contact surfaces 4C and 6B.

As shown in FIG. 2, the second specular optical insert 4 is formed with notches (relief surfaces) 4D and 4E to avoid coming into contact with the first and third specular optical inserts 2 and 6 at the upper portions of their contact surfaces. When the first, second, and third specular optical inserts 2, 4, and 6 are incorporated in the housing 8A, the notches 4D and 4E form grooves 12 and 14 extending from the optical functional surfaces (see FIG. 4).

Stainless steel (SUS) is used to form the specular optical inserts 2, 4, and 6, and the spacer 10.

The sizes of the respective portions of the respective members will be described.

The X-direction size of the nest 8 is 10±0.002 mm, and the Y-direction size thereof is 37±0.002 mm.

The X-direction outer size of the first specular optical insert 2 is 10±0.002 mm, and the Y-direction size thereof is 15±0.001 mm. The X-direction size of the second specular optical insert 4 is 10±0.002 mm, and the Y-direction size thereof is 10±0.001 mm. The X-direction size of the third specular optical insert 6 is 10±0.002 mm, and the Y-direction size thereof is 12±0.001 mm.

Regarding the size of the notches of the specular optical insert 4 to form the grooves 12 and 14, their width db is 0.005 mm, and their depth dL from the cavity surface 4A is 5.0 mm.

A height L of the specular optical inserts in this embodiment is 30.0 mm.

To suppress the tilt eccentricity about the X axis to 1 minute or less in a molded product, the length of the contact area between the adjacent specular optical inserts is set to 25 mm in the Z direction so as to set the tilt eccentricity of the mold to ⅔ minutes or less.

For this reason, in a range of 5 mm from the optical functional surface in the Z direction, the adjacent specular optical inserts do not come into contact with each other in the presence of the grooves 12 and 14.

Figure 5:
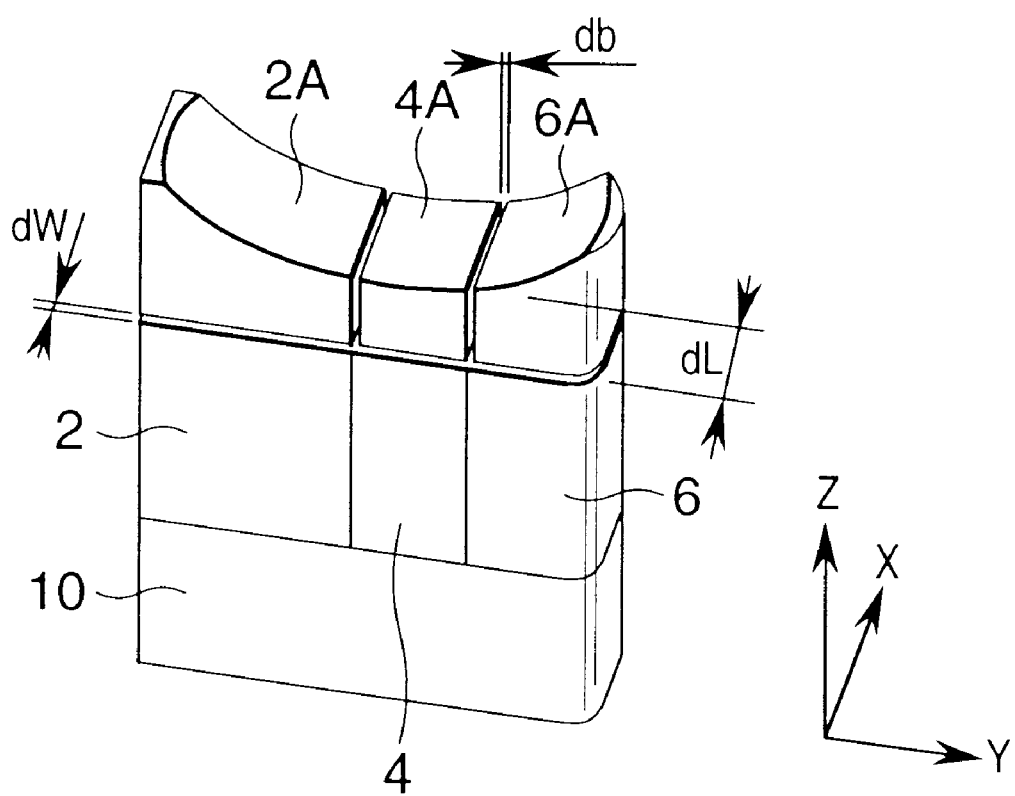
FIG. 5 is a view for explaining a modification of specular optical inserts.

FIG. 5 shows a modification of the mold according to the first embodiment.

In this modification, a relief notch dw is formed in the upper surface of each specular optical insert. Accordingly, when three specular optical inserts 2, 4, and 6 identical to those described above are housed in a housing 8A of a nest 8, they do not come into contact with the inner surface of the housing 8A.

The sizes of the respective portions of the specular optical inserts 2, 4, and 6 are equal to those described above, and the relief size dw is set to 0.002 mm in the X direction.

Description on Mold Incorporating Structure

FIGS. 6 to 9 are views for explaining the incorporating structure of the mold member obtained by housing the specular optical inserts in the nest.

Figure 6:
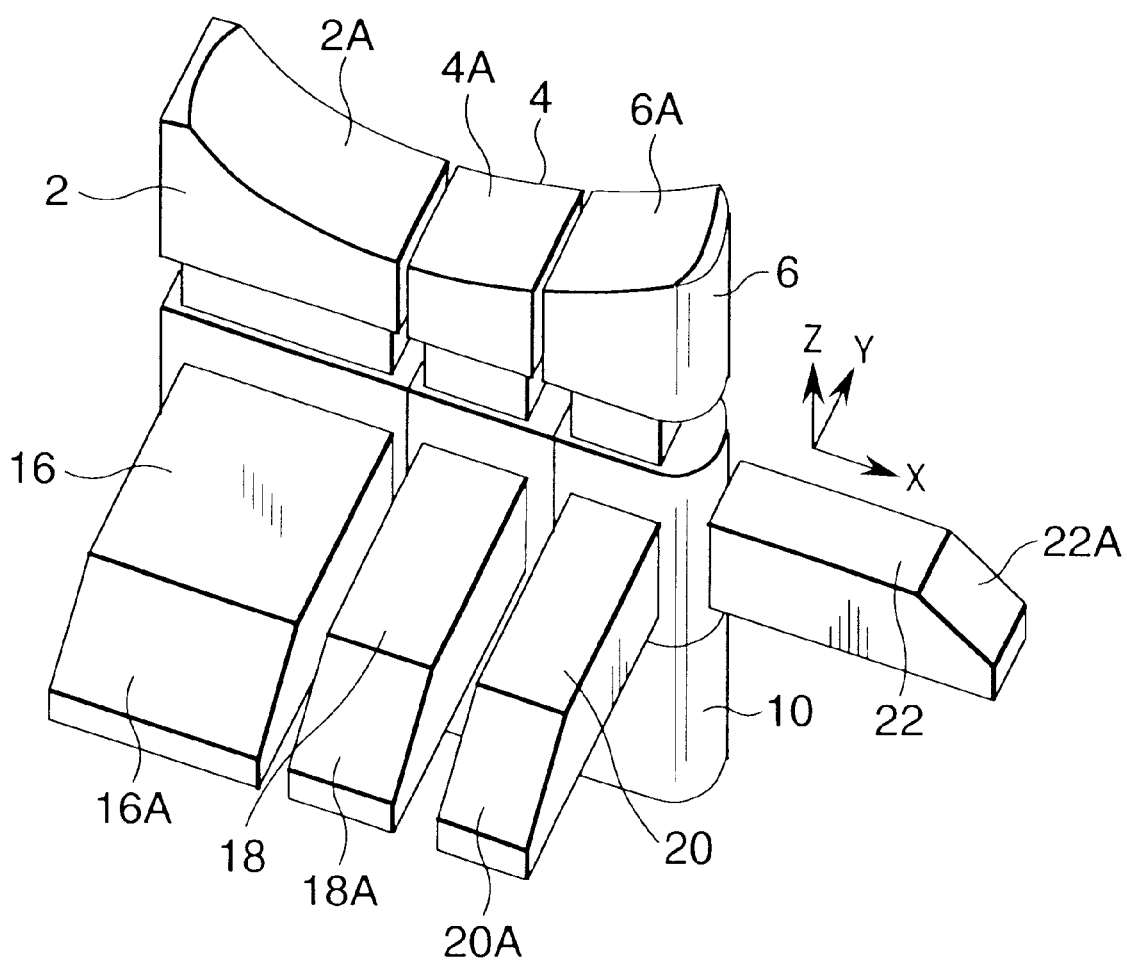
FIG. 6 is a view for explaining a mold structure.

Referring to FIG. 6, the specular optical inserts 2, 4, and 6 are housed in the housing 8A of the nest 8 (not shown), and the respective specular optical inserts are pressed by first press members 16, 18, 20, and 22 toward reference positions in the housing 8A.

Figure 7:
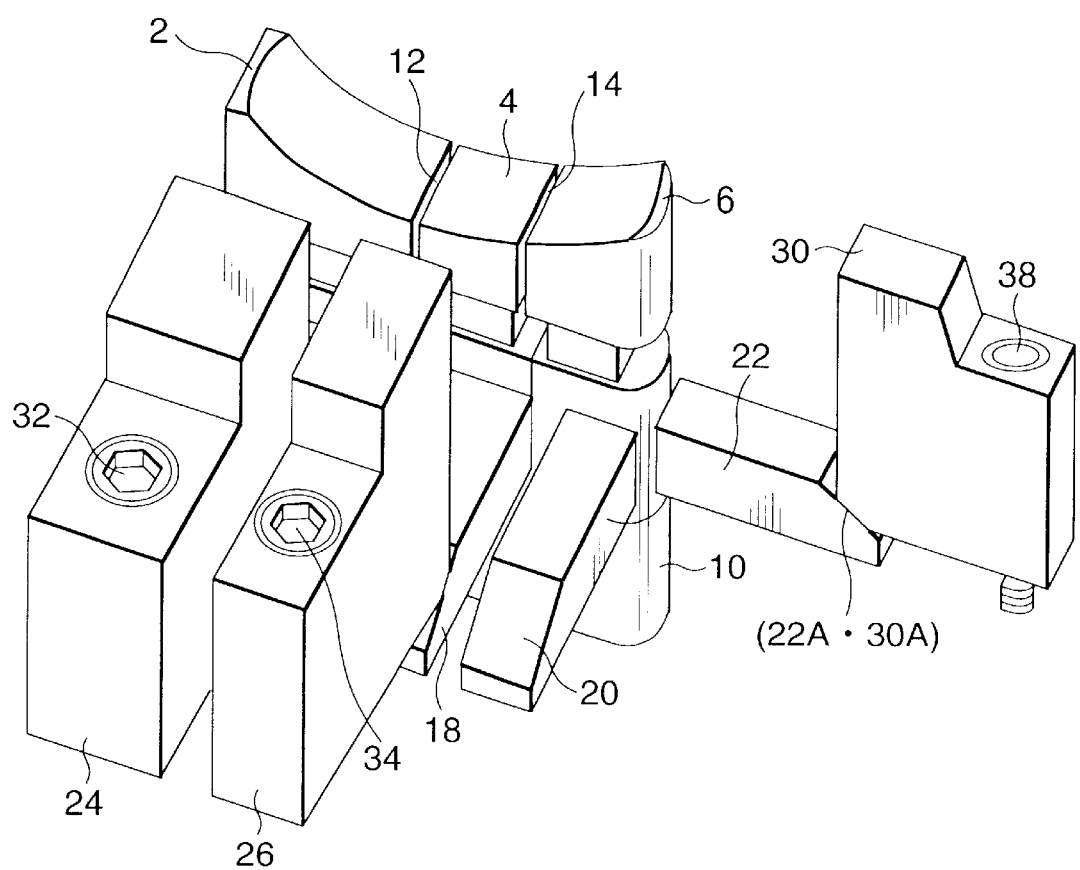
FIG. 7 is a view for explaining the relationship between the specular optical inserts and press members.

FIG. 7 shows the positional relationship among second press members 24, 26, 28 (not shown), and 30 that press the first press members 16, 18, 20, and 22. Screws 32, 34, 36 (not shown), and 38 adjust the pressure.

Figure 8:
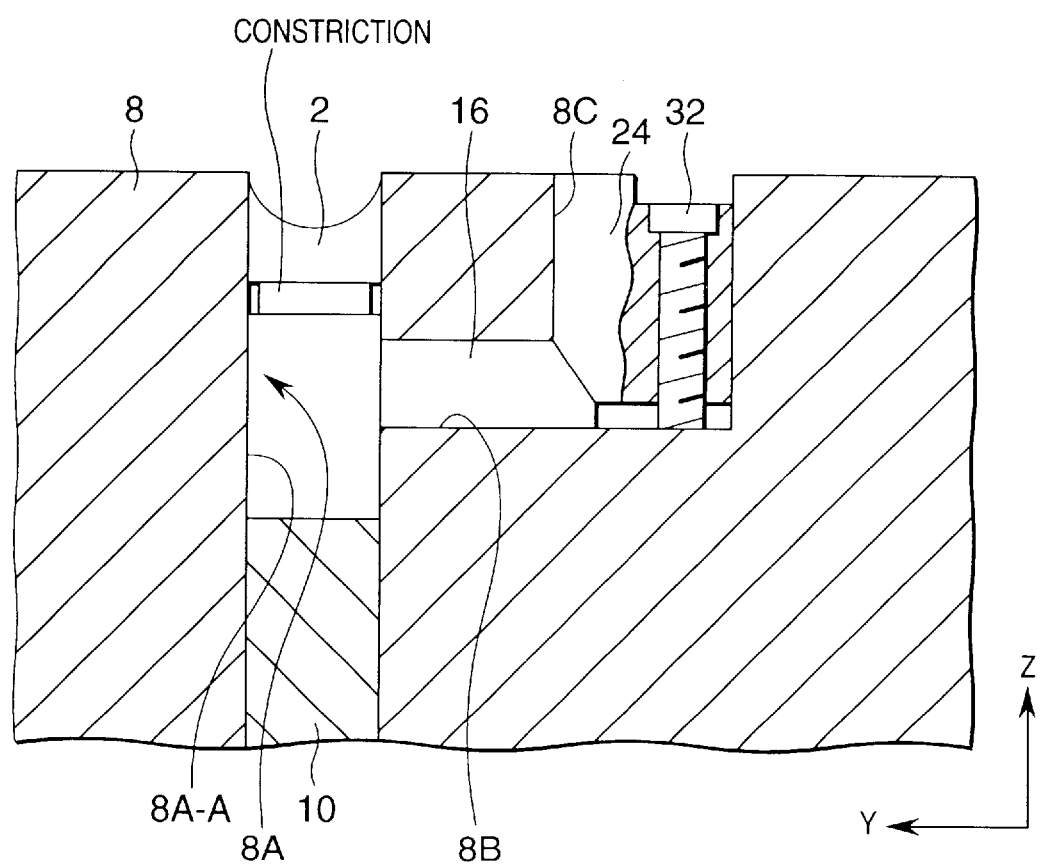
FIG. 8 is a view for explaining a section of the main part of the nest.

As shown in FIG. 8, in the section of the nest 8 for housing the specular optical inserts 2, 4 and 6, the housing 8A and housings 8B and 8C are formed. The housing 8A houses the spacer 10 and the specular optical inserts 2, 4, and 6 arranged on the spacer 10. The housing 8B houses the first press members 16, 18, 20, and 22 (18, 20, and 22 are not shown). The housing 8C houses the second press members 24, 26, 28, and 30 (26, 28, and 30 are not shown). The housing 8B for the first press members and the housing 8C for the second press members are continuous to be substantially perpendicular to each other.

One side surface 8A-A of the housing 8A of the specular optical inserts are formed as a reference surface for pressing and holding the respective optical inserts members.

In FIGS. 6 and 7, constrictions are formed in the bottom columns, which are to be placed on the spacer 10, of the specular optical inserts 2, 4, and 6. This prevents the pressure of the press members from affecting the specular portions.

How to incorporate the specular optical inserts will be described.

The respective specular optical inserts 2, 4, and 6 are placed on the spacer 10 set in the housing 8A of the nest 8. The first and second press members are inserted and arranged in the press member housings 8B and 8C, respectively.

Figure 9:
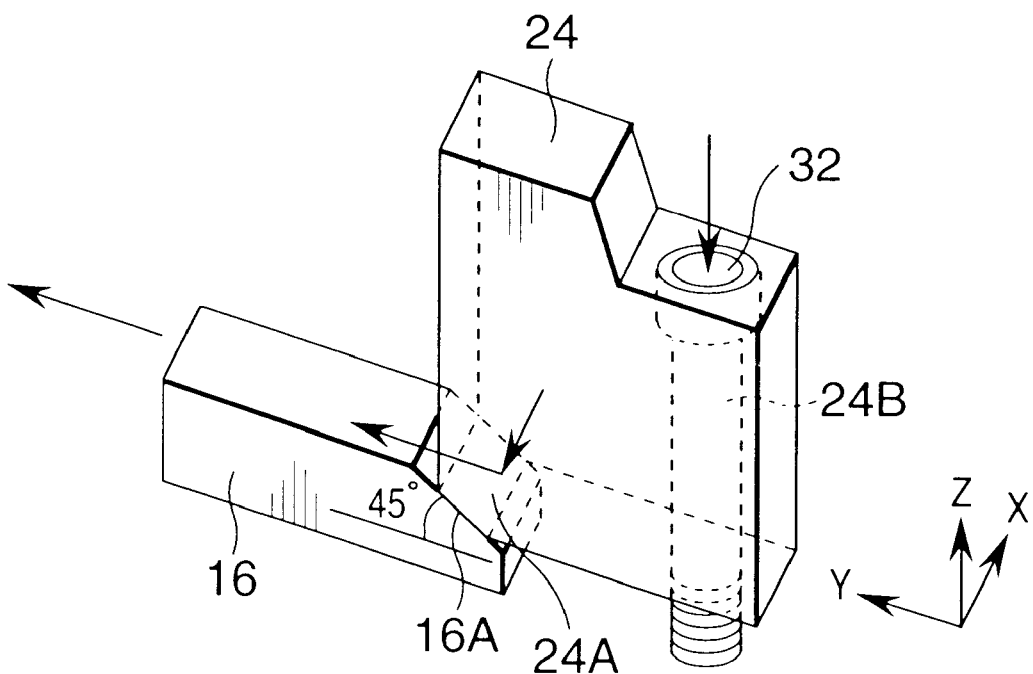
FIG. 9 is a view for explaining the function of the press members.

As shown in FIG. 9, the first and second first press members 16 and 24 are in contact with each other through their tilted surfaces 16A and 24A tilted by 45°. The second press member 24 is formed with a screw hole 24B for allowing the second press member 24 to move in the Z direction upon application of a pressure.

Figure 10:
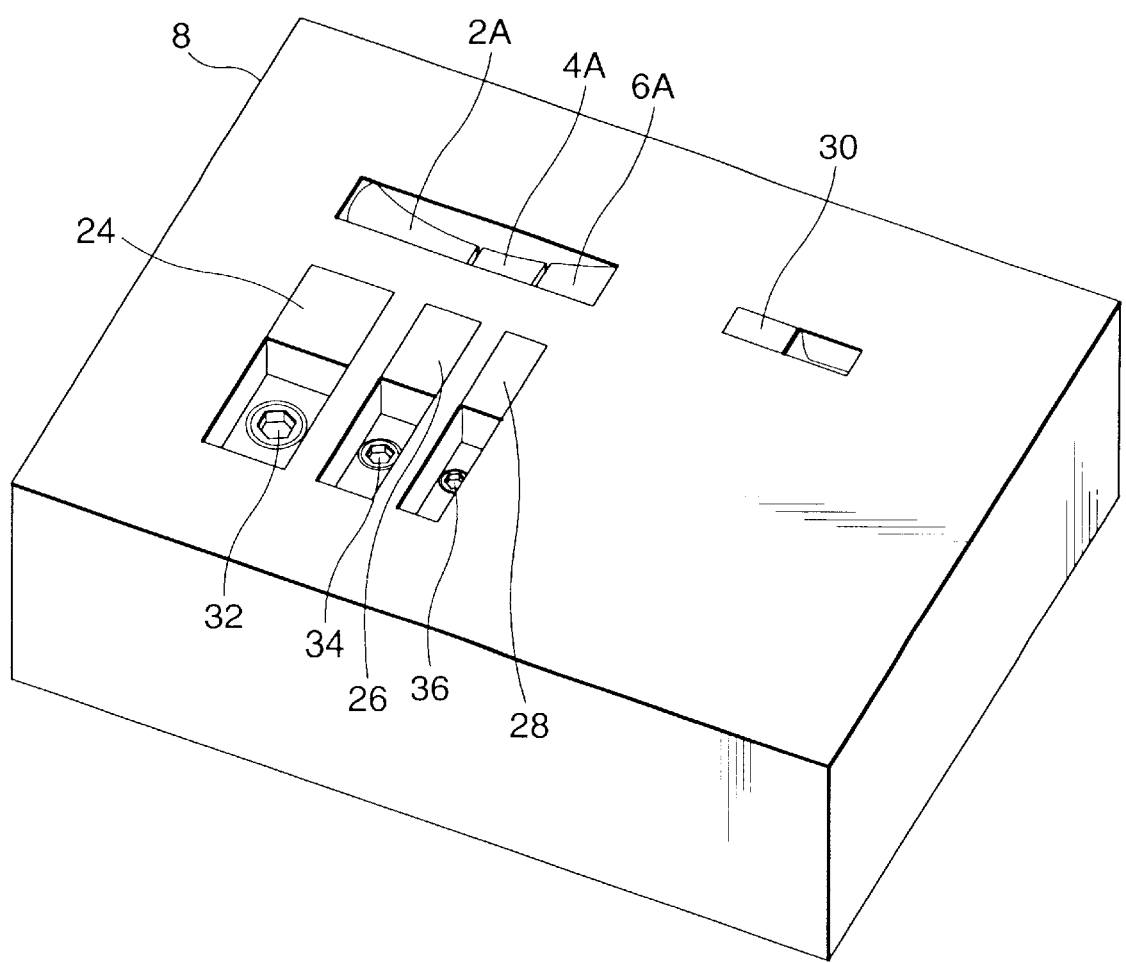
FIG. 10 is a view for explaining how to incorporate the specular cores in the nest.

As shown in FIG. 10, after the specular optical inserts and the respective first and second press members are arranged in the nest 8, the screws 32, 34, 36, and 38 are screwed to push the second press members 24, 26, 28, and 30 in the Z direction. The force of the second press members is transmitted to the first press members 16, 18, 20, and 22 to urge the specular optical inserts 2, 4, and 6 against the reference position surface 8A-A of the housing 8A.

The screw fastening force of each screw is adjusted by setting the torque of the screw driver, thereby adjusting the pressure on the corresponding specular core.

In this embodiment, stainless-steel hexagon headed bolts are used as the screws, and are fixed with a fastening torque of 5 kgfcm.

As shown in FIG. 10, the specular optical inserts 2, 4, and 6 are mounted on and fixed to the nest 8. After that, the nest 8 is mounted on the movable template of the mold unit.

A stationary template for molding optical functional surfaces opposing optical element functional surfaces 2A, 4A, and 6A of the specular optical inserts are arranged on the stationary side of the mold unit, thus constituting the molding apparatus.

Description on Molding Apparatus

FIGS. 11 to 14 are views for explaining the main part of the molding apparatus which incorporates the mold structure described above.

The same reference numerals as those described above denote the same members.

Referring to FIGS. 11 to 14, reference numeral 2 denotes the specular optical insert described above; 8, the nest; and 10, the spacer.

Reference numeral 40 denotes a movable mounting plate. A spacer block 42 is mounted on the fixed plate 40. Reference numeral 44 denotes a movable backing plate. A movable mold base 46 is mounted on the backing plate 44. The cavity block 8 is incorporated in the mold base 46.

Reference numerals 48A and 48B denote ejector plates; and 50A and 50B, ejector pins.

Reference numeral 52 denotes a stationary fixed plate 52; and 54, a stationary mold base. The mold base 54 holds a stationary cavity block 58 for housing a stationary specular optical insert 56 that forms a stationary cavity surface.

Reference numeral 60 denotes a position adjusting spacer of the stationary specular optical inserts.

Reference numeral 62 denotes a locating ring.

Figure 12:
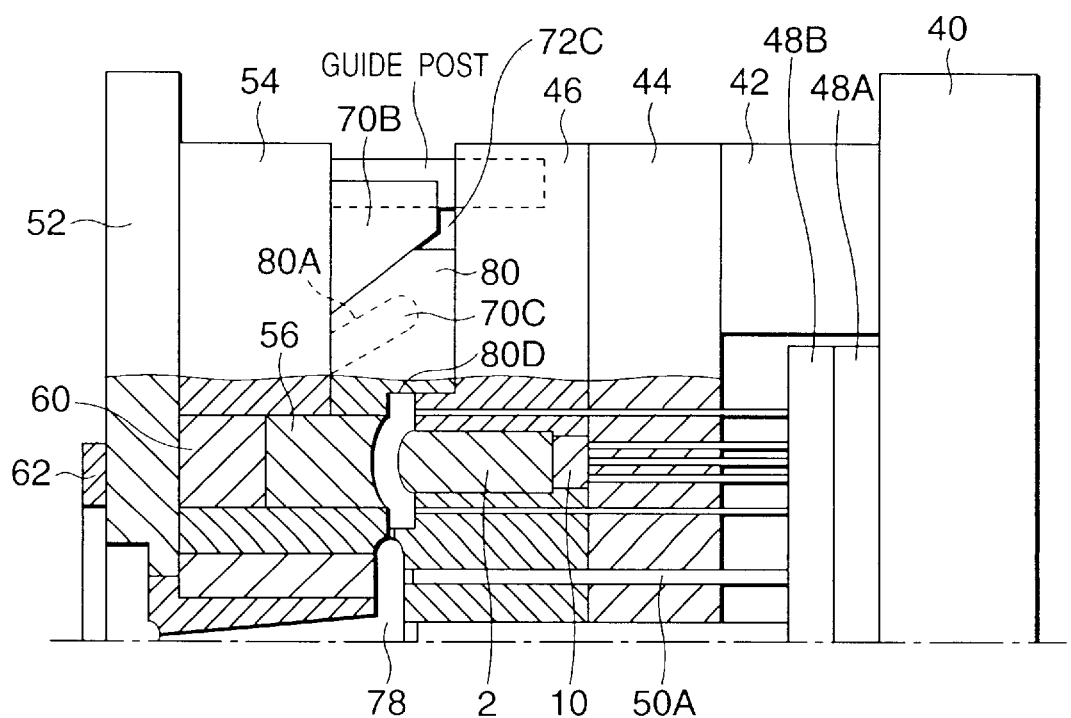
FIG. 12 is a sectional view of the main part of the molding apparatus.

Reference numerals 64, 68, and 80 denote first, second and third specular optical insert holders, respectively. The third specular optical insert holder 80 is shown in FIG. 12. The first, second, and third specular optical insert holders 64, 68, and 80 are respectively formed with slide holes 64A, 68A, and 80A for slidably guiding angular pins. The holders 64, 68, and 80 fix and hold the movable specular optical insert 2 and stationary specular optical insert 56 relative to each other by the function of angular pins 70A, 70B, and 70C to be described later.

Locking blocks 72A and 72B are mounted on the stationary mold base 54.

The locking blocks 72A and 72B are formed with tilted surfaces 72C and 72D which come into contact with tilted surfaces 64C and 68C of the specular optical insert holders 64 and 68, respectively.

Figure 14:
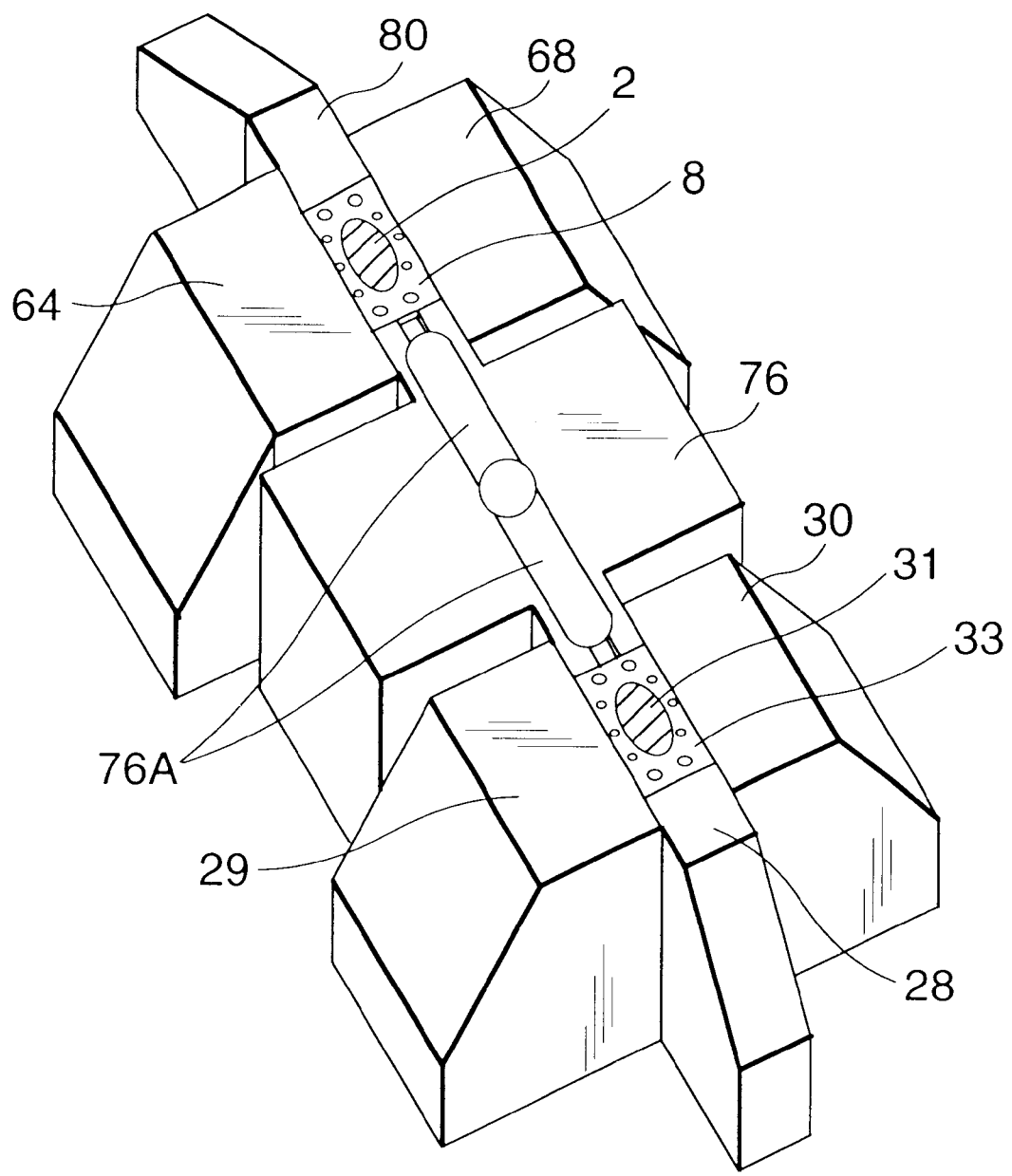
FIG. 14 is a view showing the relationship between the nest and the press members.

A runner 76A is formed in a runner block 76 (see FIG. 14).

FIG. 14 is a perspective view of the main part of the movable mold unit. This embodiment shows two-product molding of molding two products simultaneously.

Figure 11:
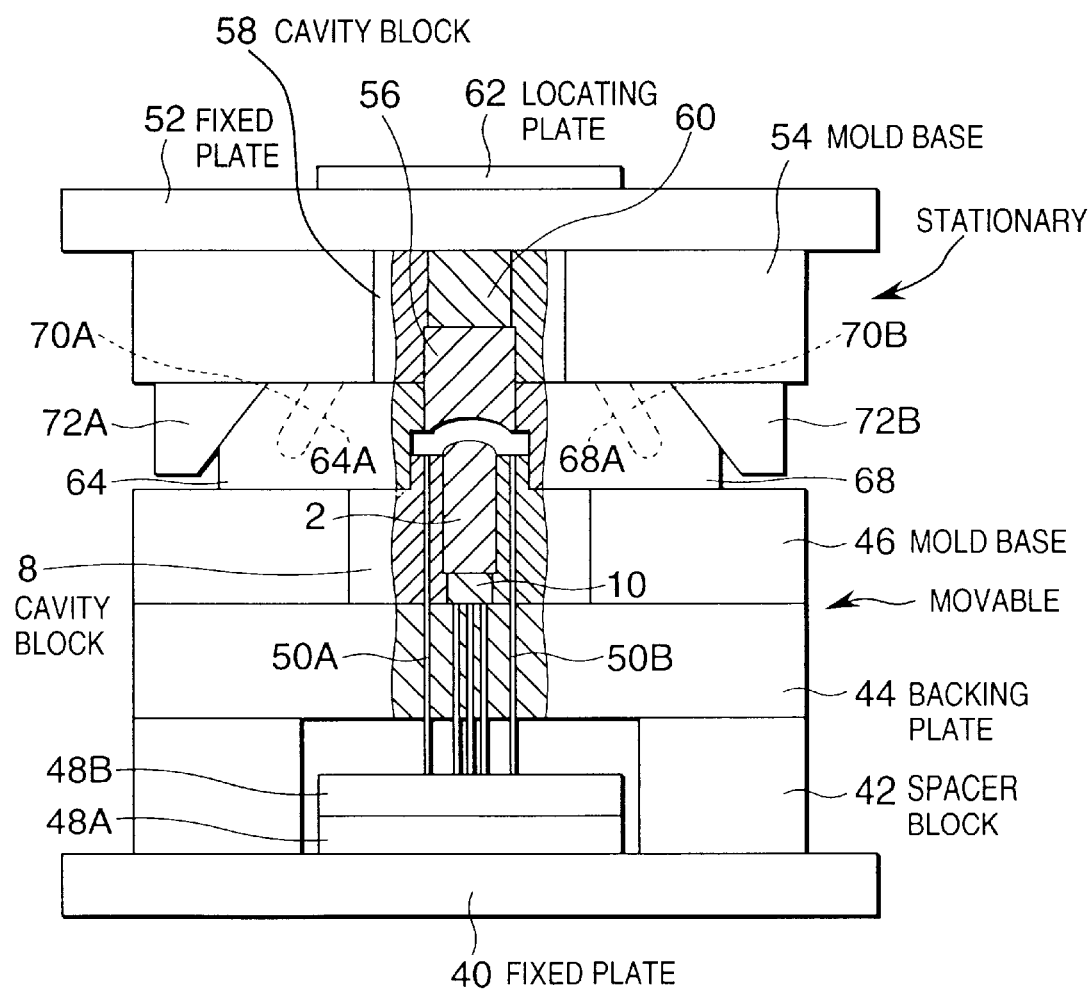
FIG. 11 is a view for explaining the main part of a molding apparatus.

Referring to FIG. 11, the specular optical insert 56 is incorporated in the stationary cavity block 58 to project from the surface position of the stationary cavity block 58 toward the movable side by about 10 mm.

Figure 13:
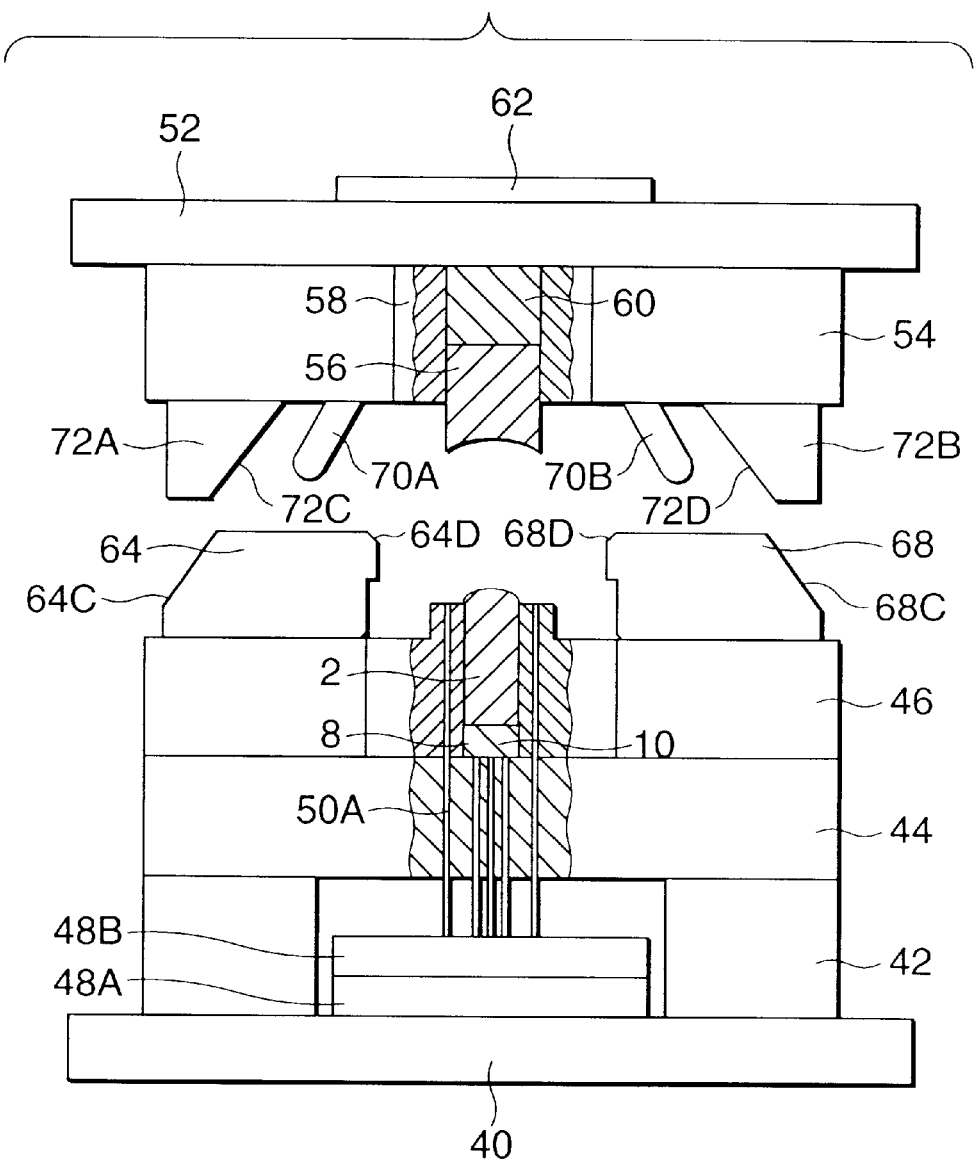
FIG. 13 is a view showing a state wherein the molding apparatus is mold-opened.

The specular optical insert 56 has a quadrilateral section. As shown in FIG. 12, one of the side surfaces of the quadrilateral section of the stationary specular optical insert 56 abuts against a runner piece 78, while the remaining three side surfaces thereof are abutted by the specular optical insert holders 64, 68, and 80 incorporated in the movable side from three directions, as shown in FIG. 13.

Abutting surfaces 64D, 68D, and 80D of the optical insert holders 64, 68, and 80 form part of the cavity surface of the optical element to be molded, as shown in FIG. 12.

As described above, when the side surfaces of the cavity surface are formed of the abutting surfaces of the optical insert holders 64, 68, and 80, a right angle between the side surfaces and the optical functional surface formed of the stationary specular optical insert 56 can be maintained highly precisely, and these side surfaces can be used as the reference surfaces for measuring the shape precision of the optical functional surfaces and as the incorporation reference surfaces required when incorporating the optical element.

How to Mold Optical Element

From the mold-open state shown in FIG. 13, the movable fixed plate 40 and movable backing plate 44 are moved in a mold closing direction by a mold closing means (not shown), as shown in FIG. 11, to insert the angular pins 70A, 70B, and 70C in the tilted holes of the optical insert holders 64, 68, and 80. The optical insert holders 64, 68, and 80 slide on the movable mold base 46 to close the mold.

After that, the respective specular optical inserts are heated by a heating means (not shown), and a molten resin material is injected by an injection screw in an injection cylinder (not shown). The resin material to be used is an Polymethacrylate (PMMA).

As described above, according to this embodiment, when suppressing the parallel eccentricity and tilt eccentricity of the specular optical inserts 2, 4, and 6, the clearance among the respective specular optical insert holders and between the specular optical inserts and the housing of the nest need not be strictly defined, and the reference surface of the cavity block and the reference surfaces of the specular optical inserts can be brought into stable contact with each other. Therefore, when the mold is to be re-assembled for overhauling the mold or cleaning the specular optical inserts, or when the specular optical inserts are to be exchanged, the positional relationship can be reproduced well, so that an optical element having a stable quality can be molded.

Second Embodiment

Figure 15:
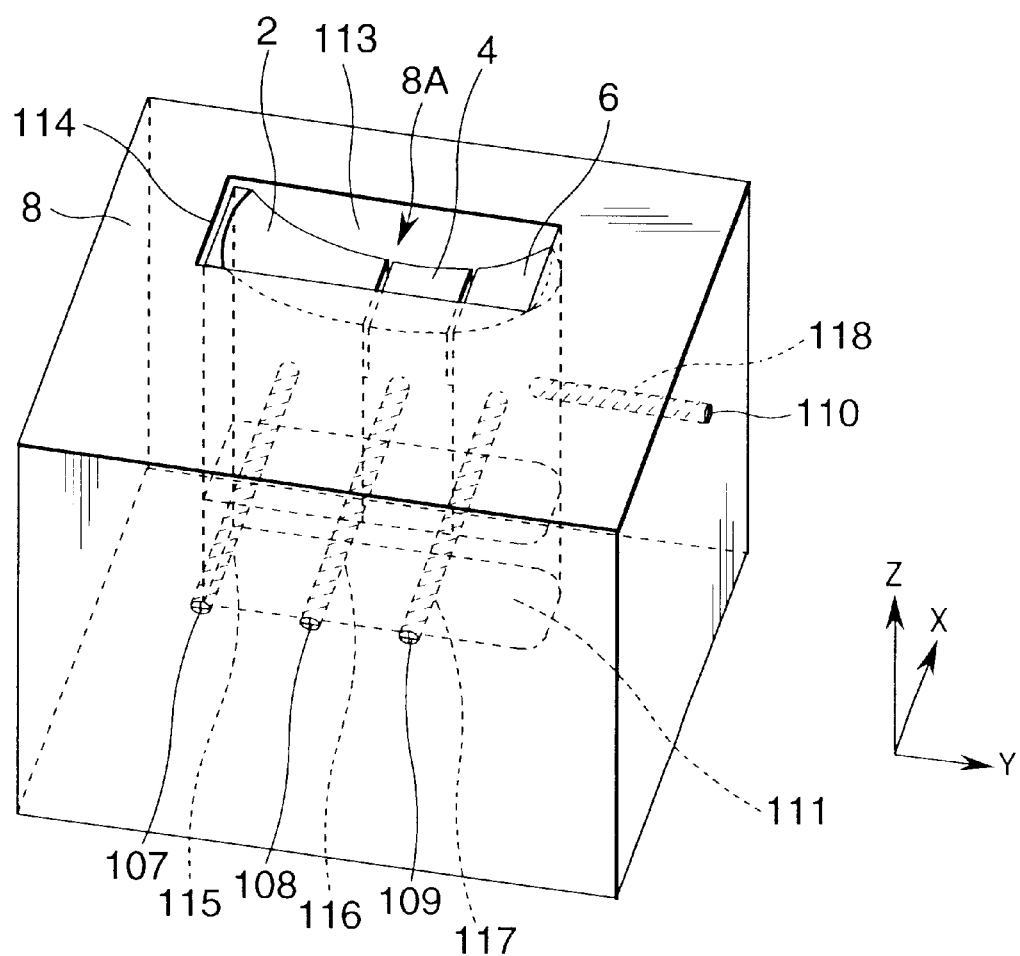
FIG. 15 is a view showing the second embodiment of the present invention.

FIG. 15 is a view showing a mold structure according to the second embodiment.

FIG. 15 shows three optical inserts and four set screws.

The three optical inserts constitute the stationary side of a mold that forms an optical component having three adjacent optical surfaces. The three set screws press the side surfaces, on the counter reference surface sides, of the three optical inserts, respectively, to urge the X-direction reference surfaces of the optical inserts against the X-direction reference surface of the inner wall of a cavity block pocket. The remaining set screw presses the three optical inserts in the Y direction to urge them against the Y-direction reference surface of the cavity block pocket. In the second embodiment, the same functional portions as in the first embodiment are denoted by the same reference numerals.

Referring to FIG. 15, first, second, and third optical inserts 2, 4, and 6 form stationary optical surfaces. Reference numerals 2A, 4A, and 6A denote optical forming surfaces of the optical inserts 2, 4, and 6, respectively. A set screw 107 pushes a side surface, on the X-direction counter reference surface side, of the optical inserts 2. A set screw 108 pushes a side surface, on the X-direction counter reference surface side, of the optical inserts 4. A set screw 109 pushes a side surface, on the X-direction counter reference surface side, of the optical inserts 6. A set screw 110 presses the Y-direction counter reference surface of the optical insert 6. A position adjusting block 111 adjusts the Z-direction positions of the optical inserts 2, 4, and 6. Reference numeral 8 denotes a cavity block; 113 and 114, X- and Y-direction reference surfaces, respectively, of the inner surface of a cavity block pocket 8A of the cavity block 8 where the optical inserts are to be inserted. Screw holes 115 and 116 correspond to the screws that urge the optical inserts 2 and 4, respectively, in the X direction. Screw holes 117 and 118 correspond to the screws that urge the optical insert 6 in the X and Y directions, respectively.

The distal ends of the set screws 107, 108, 109, and 110 have a hemispherical shape. Hence, even if the screw holes 115, 116, 117, and 118 formed in the piece holder 8 do not have accurately right angles with the reference surfaces 113 and 114 in the piece holder pocket 8A, the distal ends of the screws and the side surfaces of the optical inserts can be maintained in stable contact with each other.

The shape of the distal end is not limited to a hemispherical shape, but may be any shape having a curvature with which the axis of the urging screw matches the center of the shape.

An adjusting mechanism will be described with reference to FIG. 16.

Figure 16:
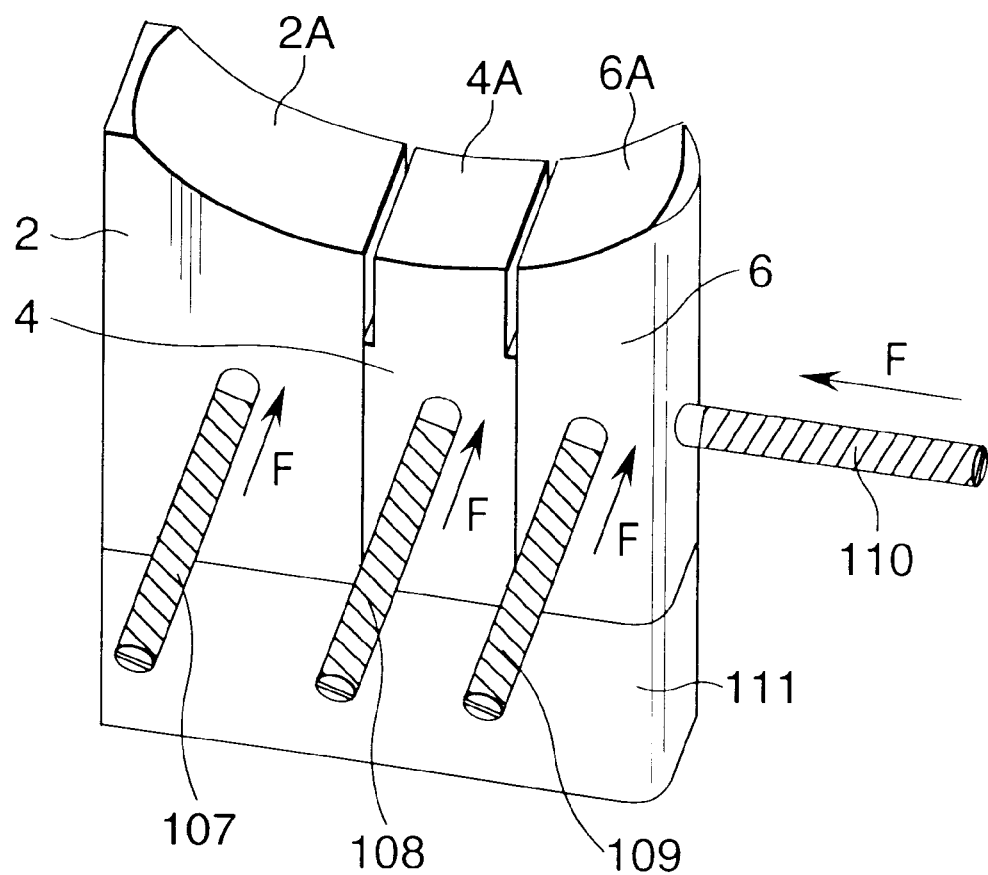
FIG. 16 is a view for explaining the mechanism of the second embodiment of the present invention.

FIG. 16 shows the set screws 107, 108, and 109 for pressing the X-direction side surfaces of the optical inserts 2, 4, and 6, and the set screw 110 for pressing the Y-direction side surface of the optical insert 6. As the set screws 107, 108, 109, and 110 are fastened with a torque, they move in the directions of the side surfaces of the optical inserts 2, 4, and 6. The side surfaces of the optical inserts come into contact with the hemispherical portions at the distal ends of the set screws to produce a pressure, thereby urging the machining reference surfaces of the optical inserts 2, 4, and 6 against the reference surfaces of the nested piece pocket.

SUS (stainless steel) M4 set screws are used as the set screws 107, 108, 109, and 110. The fastening force is controlled by a torque wrench, and the optical inserts are fixed with a fastening torque of 5 kgfcm. In this structure, a compression force acts on the side surface of the optical inserts 2. If the amount of thermal expansion of the optical inserts 2, 4, and 6 caused by temperature adjustment during molding is different from that of the optical insert 8, the compression force acting on the optical inserts 2, 4, and 6 changes. To prevent this, in this embodiment, the piece holder 8, the optical inserts 2, 4, and 6, and the set screws 107, 108, 109, and 110 are all made of SUS. Changes in compression force include a decrease and increase in compression force. The disadvantages of the decrease and increase in compression force will be described. When the compression force decreases, the force for fixing the optical inserts decreases, and the pressure applied to the optical inserts by the injection pressure may shift the positions of the optical inserts. When the compression force increases, an excessively large compression force is applied to the side surfaces of the optical inserts, and the amount of deformation of the optical inserts themselves increases to deform and distort even the optical surfaces. Even if the optical inserts themselves are incorporated at regulated positions in tight contact with the reference surfaces of the inner wall of the piece holder pocket, the optical surfaces themselves requiring the highest positional precision may deform to be eccentric.

In this embodiment, in order to prevent the nested pieces from being deformed by the set screws so the optical surfaces will not be distorted, the position where the set screw is in contact with the optical inserts is determined, by using FEM analysis, at a position that does not affect the optical surfaces.

As described above, the optical inserts 2, 4, and 6 are urged against the X-direction reference surface 113 in the piece holder pocket 8A by the set screws 107, 108, and 109, and are accordingly incorporated such that their X-direction positions can be set with excellent reproducibility. Regarding the Y direction, the Y-direction side surface of the optical insert 6 is pressed by the set screw 110 by the same mechanism used for the X direction. The optical insert 6 pressed in the Y direction presses the optical insert 4 in the Y direction, and the optical insert 4 presses the optical insert 2 in turn. Finally, the Y-direction reference surface of the optical insert 2 pressed by the optical inserts 6 and 4 comes into tight contact with the Y-direction reference surface 114 in the piece holder pocket 8A, to position the optical insert 2 in the X and Y directions.

As described above, according to this embodiment, when minimizing the parallel eccentricity and tilt eccentricity, the clearance need not be decreased very small, and the reference surface of the cavity block and the reference surfaces of the optical insert can be stably brought into contact with each other. Accordingly, even when the mold is exchanged, the optical insert can be incorporated with excellent reproducibility. Since the fitting clearance between the cavity block and the optical inserts need not be decreased, when incorporating the optical inserts in the cavity block pocket, piece bite does not occur. When incorporating the optical inserts, the side surfaces of the optical inserts will not be damaged by contact with the cavity block or with the side surfaces of the adjacent optical inserts. As a result, the flatness and right-angled state of the reference side surfaces can be assured, and the stability of the incorporated state can be sustained.

Third Embodiment

Figure 17:
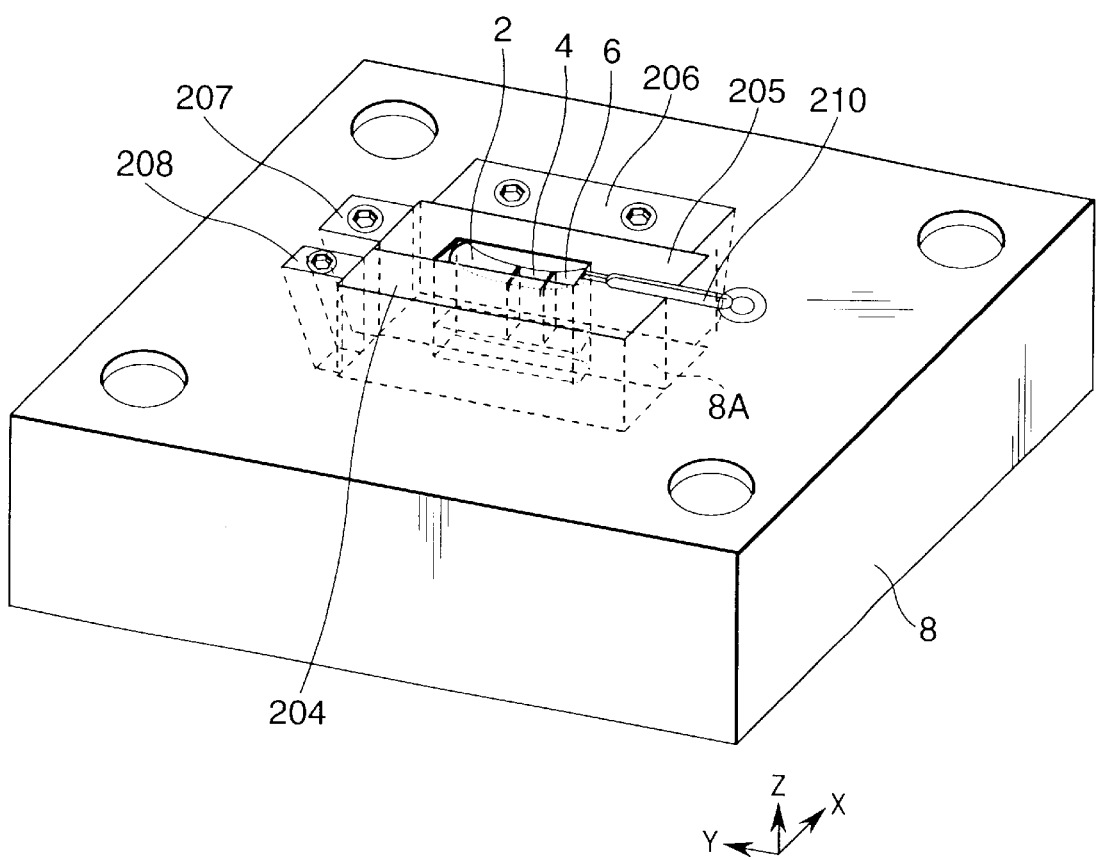
FIG. 17 is a view showing the third embodiment of the present invention.

FIG. 17 is a view showing a mold structure according to the third embodiment. FIG. 17 shows three optical inserts 2, 4, and 6, L-shaped blocks 204 and 205, a cavity block 8 having a pocket 8A, and taper blocks 206, 207, and 208. The three optical inserts 2, 4, and 6 constitute the stationary side of a mold that manufactures an optical component having three adjacent optical surfaces. The L-shaped blocks 204 and 205 regulate the side surfaces of the three optical inserts 2, 4, and 6. The taper blocks 206, 207, and 208 fix the L-shaped blocks 204 and 205 by abutting them against the inner wall of the cavity block pocket 8A. In the third embodiment, the same functional portions as those of the first and second embodiments are denoted by the same reference numerals.

The first, second, and third optical inserts 2, 4, and 6 form the stationary optical surfaces. The L-shaped block 204 has an abutting surface opposing the machining reference surfaces of the optical inserts. The L-shaped block 205 presses the counter machining reference surfaces of the optical inserts to fix the three optical inserts by abutting them against the L-shaped block 204. The taper block 206 presses the L-shaped block 205 in the X direction in FIG. 17. The taper block 207 presses the L-shaped block 205 in the Y direction in FIG. 17. The taper block 208 presses the L-shaped block 204 in the Y direction in FIG. 17. Reference numeral 8 denotes the stationary cavity block.

How to fix the nested pieces will be described with reference to FIGS. 18, 19. and 20.

Figure 18:
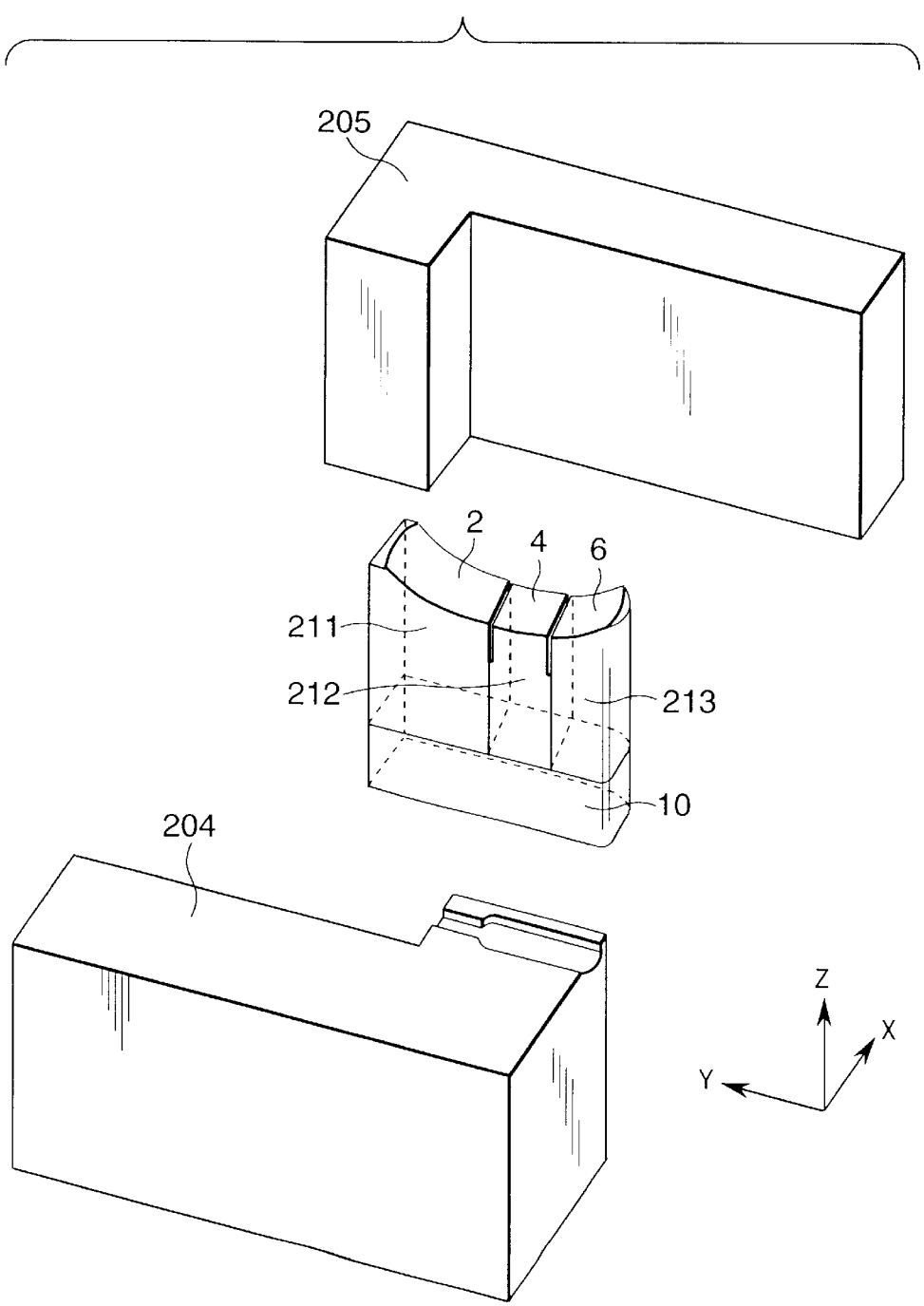
FIG. 18 is a view showing the configuration of components before assembly according to the third embodiment of the present invention.

FIG. 18 shows the optical inserts 2, 4, and 6 and the L-shaped blocks 204 and 205 before they are incorporated. As shown in FIG. 19, the optical inserts 2, 4, and 6 are built in the L-shaped block 204 on the nest machining reference surface side such that their machining reference surfaces 211, 212, and 213 come into tight contact with it.

Figure 20:
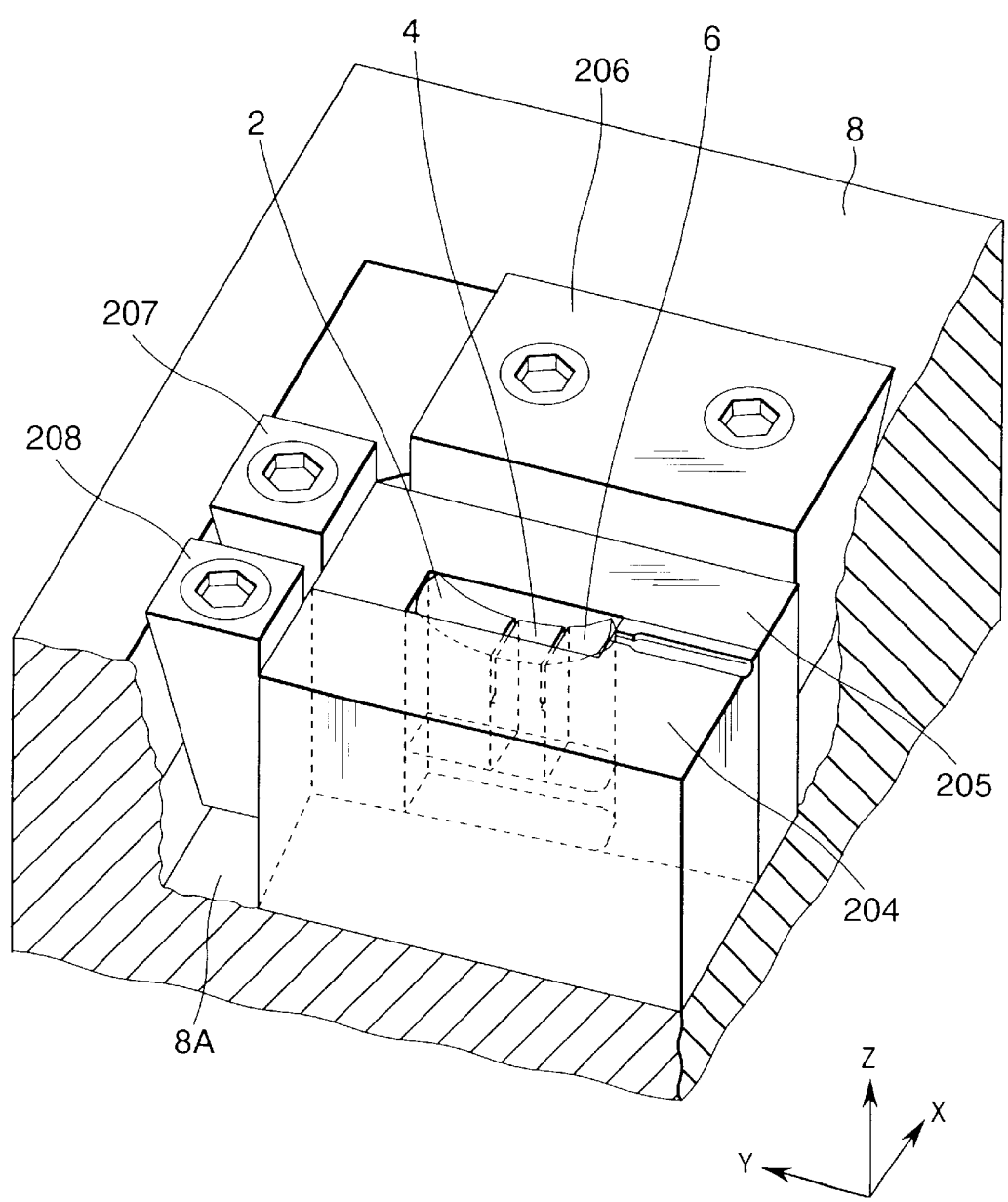
FIG. 20 is a view showing a state wherein the nested pieces are incorporated in a piece holder pocket according to the third embodiment of the present invention.

The L-shaped block 205 is arranged as shown in FIG. 20 to surround the optical inserts 2, 4, and 6 at a position opposing the L-shaped block 204. The size of the L-portion of the L-shaped block 205 is adjusted such that, when the L-shaped block 205 is pressed toward the L-shaped block 204, the L-shaped block 205 comes into contact with the optical inserts 2, 4, and 6 but does not come into contact with the L-shaped block 204. The clearance between the L-shaped blocks 204 and 205 must be made small so the resin will not flow into it. In this embodiment, this clearance is set to 10 μm.

To press and fix the L-shaped block 204, optical inserts 2, 4, and 6, and L-shaped block 205 against and to the inner surface of the pocket 8A of the cavity block 8, the L-shaped block 204 is pressed by the taper block 208 in the Y direction. Thus, the optical inserts 2, 4, and 6 can be pressed against and fixed to the inner wall of the pocket 8A of the cavity block 8, as shown in FIG. 20.

The taper blocks 206, 207, and 208 are fastened with SUS (stainless steel) M6 bolts. The fastening force is controlled by a torque wrench, and the taper blocks 206, 207, and 208 are fixed with a fastening torque of 5 kgfcm. In this structure, a compression force acts on the side surface of the optical insert 2. If the amount of thermal expansion of the optical inserts 2, 4, and 6 caused by temperature adjustment during molding is different from that of the cavity block 8, the compression force acting on the optical inserts 2, 4, and 6 changes. To prevent this, in this embodiment, the cavity block 8, the nested pieces 2, 4, and 6, the L-shaped blocks 204 and 205, and the taper blocks 206, 207, and 208 are all made of SUS.

If the optical inserts are positioned by positioning bolts or the like as in the second embodiment, the compression force directly acts on the optical inserts, and the nested pieces may deform due to a change in compression force. In the third embodiment, problems that may arise in the second embodiment are avoided.

Changes in compression force include a decrease and increase in compression force. The disadvantages of the decrease and increase in compression force will be described. When the compression force decreases, the force for fixing the optical insert decreases, and the positions of the optical inserts may be shifted by the injection pressure. When the compression force increases, an excessively large compression force is applied to the side surfaces of the optical inserts, and the amount of deformation of the optical inserts themselves increases to deform and distort even the optical surfaces. Even if the nested pieces themselves are incorporated at regulated positions in tight contact with the reference surface of the inner wall of the cavity block pocket, the optical surfaces themselves requiring the highest positional precision may deform to be eccentric.

In this embodiment, a machining error in outer size among the optical inserts 2, 4, and 6 is suppressed to 0.5 $\mu$m. Since the machining error cannot be made zero, the compression force is concentrated on the widest one of the optical inserts 2, 4, and 6. Then, this widest optical insert may deform to distort its optical surface. In order to prevent this, in the third embodiment as well, the contact pieces are arranged to have a gap of about 2 $\mu$m from each other and from the L-shaped blocks for the nested pieces so they will not come into contact with other members in a range of 5 mm from the optical surfaces.

As described above, the optical inserts 2, 4, and 6 are urged against the X-direction reference surface in the cavity block pocket 8A by the L-shaped block 205 through the L-shaped block 204, and are accordingly incorporated such that their X-direction positions can be set with excellent reproducibility. Regarding the Y direction, the Y-direction side surface of the optical insert 6 is pressed by the L-shaped block 205 against the Y-direction reference surface in the cavity block pocket 8A through the L-shaped block 204 by the same mechanism used for the X direction. The optical insert 6 pressed in the Y direction presses the optical insert 4 in the Y direction, and the optical insert 4 presses the optical insert 2 in turn. Finally, the Y-direction reference surface of the optical insert 2 pressed by the optical insert 6 and 4 abuts against the Y-direction reference surface of the L-shaped block 204, so the L-shaped block 204 comes into tight contact with the Y-direction reference surface in the cavity block pocket 8A, to position the optical insert 2 in the X and Y directions.

Figure 22:
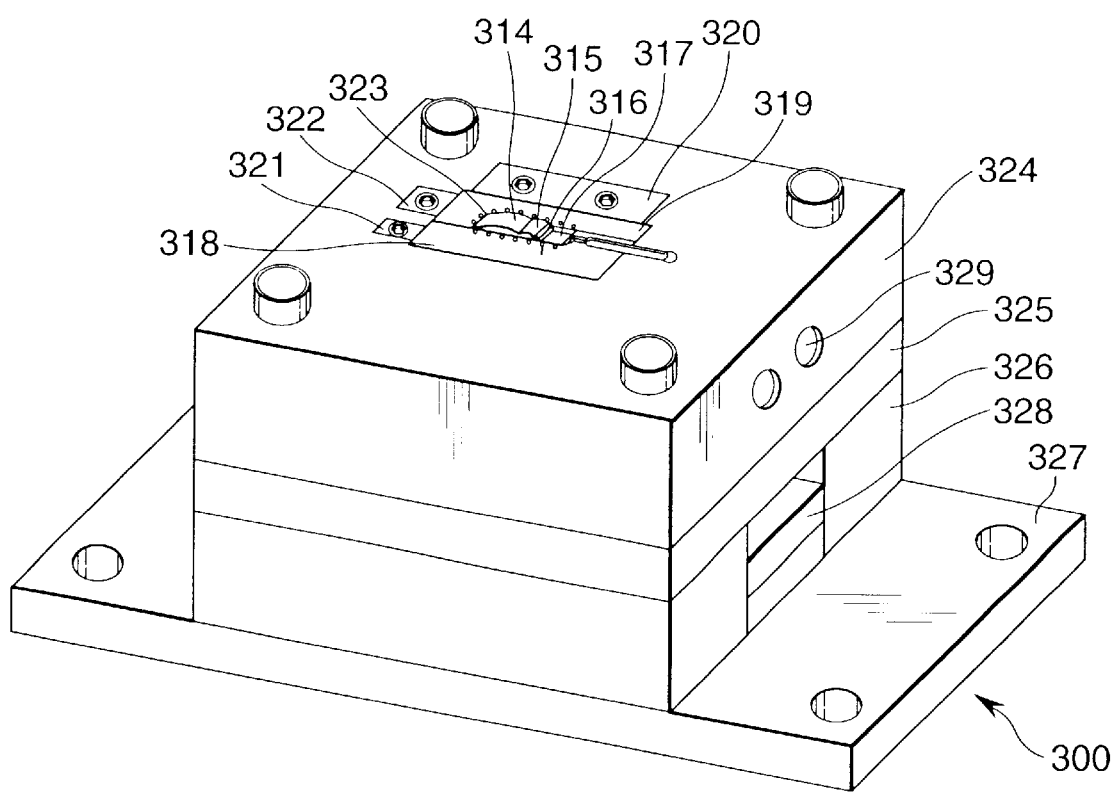
FIG. 22 is a view showing the arrangement of a movable mold.

FIG. 21 shows how to assemble a movable mold 300 with the stationary mold 200. FIG. 22 shows the structure of the movable mold 300 in detail.

Referring to FIG. 22, fourth, fifth, sixth, and seventh optical inserts 314, 315, 316, and 317 form the movable optical surfaces. Third and fourth L-shaped blocks 318 and 319 fix the optical inserts to the movable cavity block pocket. A taper block 320 abuts the L-shaped block 319 against the X-direction reference surface. A taper block 321 abuts the L-shaped block 318 against the Y-direction reference surface. A taper block 322 abuts the L-shaped block 319 against the Y-direction reference surface. An ejector pin 323 releases the molded product from the mold. Reference numeral 324 denotes a movable mold base; 325, a movable backing plate; 326, a spacer block; 327, a movable fixed plate; 328, an ejector plate; and 329, a cooling channel.

As described above, according to this embodiment, when minimizing the parallel eccentricity and tilt eccentricity, the clearance need not be decreased very small, and the reference surface of the piece holder and the reference surfaces of the nested pieces can be stably brought into contact with each other. Accordingly, even when the mold is exchanged, the optical inserts can be incorporated with excellent reproducibility. Since the fitting clearance between the cavity block and the optical inserts need not be decreased, when incorporating the optical inserts in the cavity block pocket, piece bite does not occur. When incorporating the optical inserts, the side surfaces of the optical inserts will not be damaged by contact with the cavity block or with the side surfaces of the adjacent optical inserts. As a result, the flatness and right-angled state of the reference side surfaces can be assured, and the stability of the incorporated state can be sustained.

As has been described above, according to the present invention, the eccentricity of the optical inserts can be suppressed as much as possible.

The present invention is not limited to the above embodiments and various changes and modifications can be made within the spirit and scope of the present invention. Therefore, to apprise the public of the scope of the present invention the following claims are made.

What is claimed is:

1. A mold for molding an optical element, which molds an optical element having a curved optical surface on at least one surface thereof by injecting and solidifying a melting resin material, characterized in that a mold member that forms a cavity surface for molding said optical surface comprises a plurality of optical inserts that divide said optical surface into a plurality of surfaces, and contact surfaces of said divided optical inserts which come into contact with each other have grooves extending from said optical surface.

2. The mold according to claim 1, characterized in that a groove is formed between each of said optical inserts and a housing side surface of an optical insert housing formed in a cavity block for said optical inserts.

3. A mold structure for an optical element having a curved optical surface on at least one surface thereof, characterized by comprising a plurality of specular cores that divide a cavity surface for molding said optical surface into a plurality of cavity surfaces, a cavity block having a housing for housing said plurality of optical inserts, and press means for pressing said optical inserts toward reference positions in said cavity block.

4. The mold structure according to claim 3, characterized in that said press means comprises a first press member for pressing said specular cores housed in said housing of said cavity block at said reference positions in said housing, and a second press member for pressing said first press member.

5. The mold structure according to claim 4, characterized in that said first and second press members are arranged in said housing formed in said cavity block to house said press members so as to exert pressures substantially on each other perpendicularly.

6. An optical element formed of a resin material and comprising a curved optical surface, characterized in that said optical element is molded by using a mold member having a cavity surface divided into a plurality of cavity surfaces, said cavity surface serving to mold said optical surface.

7. An optical element molded from a resin material and comprising a curved optical surface, characterized in that said optical element is molded by a mold member having a cavity surface divided into a plurality of cavity surfaces, said cavity surface serving to constitute an optical surface portion, and a groove is formed among said divided cavity surfaces.

8. An optical element molded from a resin material and having a plurality of discontinuous, adjacent curved optical surfaces, characterized in that a cavity surface of a mold for molding said optical element is formed of specular cores for molding said plurality of optical surfaces, and has a cavity block having a housing for housing said optical inserts, and adjusting means for pressing and adjusting said specular cores at reference positions in said housing, and cavity surfaces of said specular cores are positionally adjusted by said adjusting means to mold said resin material.

9. In a mold for molding an optical element having a plurality of curved optical functional surfaces, an optical element molding apparatus characterized in that an optical insert that forms a cavity surface for molding said plurality of optical functional surfaces comprises a plurality of a specular cores, said plurality of optical inserts are housed in a housing of a cavity block mounted in a mold member, and said cavity block is held by sliding operation of a slide that slides upon opening/closing a stationary mold member and a movable mold member.

10. The apparatus according to claim 9, characterized in that said plurality of optical inserts are arranged in said movable mold member.

11. An optical element characterized in that an optical insert that forms a cavity surface for molding a plurality of optical functional surfaces comprises a plurality of optical inserts, said plurality of specular cores are housed in a housing in a cavity block mounted in a mold member, said cavity block is arranged on a movable mold member side, and said cavity block is held by sliding operation of a slide that slides upon opening/closing a stationary mold member and said movable mold member, thereby molding said plurality of optical functional surfaces continuously.

12. A molding apparatus characterized in that a stationary optical insert is held by a stationary cavity block of a stationary mold member that transfers a first optical functional surface, a second optical functional surface comprises a plurality of optical surfaces, and a plurality of movable specular cores are held by a movable cavity block of a movable mold member that transfers said second optical functional surface.

13. The apparatus according to claim 12, characterized in that said stationary and movable cavity blocks are supported by a holder that slides on said movable mold member.

14. The apparatus according to claim 13, characterized in that said holder constitutes part of a cavity of an optical element molded by said specular cores.

15. A mold for molding an optical element, characterized in that an optical insert having a molding surface for forming an optical surface is inserted in a cavity block pocket for holding said optical insert, and thereafter at least one side surface of said optical insert is pressed by a screw extending through a piece holder to abut said optical insert against an inner surface of said cavity block pocket, thereby fixing said optical insert.

16. The mold according to claim 15, characterized in that a distal end of said screw has a curvature.

17. A mold for molding an optical element, characterized in that, when incorporating an optical insert, having a molding surface for molding an optical surface, at a predetermined position in said mold, two blocks having two orthogonal surfaces are arranged to oppose each other, and said optical insert is compressed and held by inner side surfaces of said two blocks.

18. The mold according to claim 17, characterized in that one of said two blocks is pressed by a stationary block having a surface not parallel to a side surface of said optical insert.

* * * * *